(12) United States Patent
Irisawa

(10) Patent No.: US 8,788,180 B2
(45) Date of Patent: Jul. 22, 2014

(54) EGR CONTROL SYSTEM FOR INTERNAL COMBUSTION ENGINE

(75) Inventor: Yasuyuki Irisawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 373 days.

(21) Appl. No.: 13/388,835

(22) PCT Filed: Aug. 6, 2009

(86) PCT No.: PCT/JP2009/063955
§ 371 (c)(1),
(2), (4) Date: Feb. 3, 2012

(87) PCT Pub. No.: WO2011/016124
PCT Pub. Date: Feb. 10, 2011

(65) Prior Publication Data
US 2012/0132184 A1  May 31, 2012

(51) Int. Cl.
F02B 47/08 (2006.01)
F02M 25/07 (2006.01)
F02D 41/22 (2006.01)

(52) U.S. Cl.
USPC . 701/107; 701/108; 123/568.16; 123/568.17; 123/568.19; 123/568.21

(58) Field of Classification Search
USPC ........ 701/103, 107, 108; 123/568.17, 568.19, 123/568.21, 568.16; 73/114.74
See application file for complete search history.

(56) References Cited

U.S. PATENT DOCUMENTS

| | | | | |
|---|---|---|---|---|
| 5,190,017 A | * | 3/1993 | Cullen et al. | 123/676 |
| 5,329,912 A | * | 7/1994 | Matsumoto et al. | 123/308 |
| 6,167,865 B1 | * | 1/2001 | Ma | 123/308 |
| 7,100,362 B2 | | 9/2006 | McGee et al. | |
| 7,275,525 B2 | * | 10/2007 | Miyasako et al. | 123/568.16 |
| 7,784,450 B2 | * | 8/2010 | Koster et al. | 123/568.17 |
| 8,051,843 B2 | * | 11/2011 | Matsudaira | 123/568.17 |
| 8,306,721 B2 | * | 11/2012 | Maruyama | 701/103 |
| 8,490,610 B2 | * | 7/2013 | Kato | 123/690 |
| 2009/0076716 A1 | * | 3/2009 | Han | 701/115 |

FOREIGN PATENT DOCUMENTS

| | | |
|---|---|---|
| JP | A-09-217658 | 8/1997 |
| JP | A-10-196463 | 7/1998 |
| JP | A-11-22561 | 1/1999 |
| JP | A-2005-207285 | 8/2005 |
| JP | A-2006-46341 | 2/2006 |
| JP | A-2006-132479 | 5/2006 |
| JP | A-2007-40275 | 2/2007 |
| JP | A-2007-263050 | 10/2007 |
| JP | A-2008-281012 | 11/2008 |

OTHER PUBLICATIONS

Oct. 20, 2009 International Search Report issued in International Application No. PCT/JP2009/063955.

* cited by examiner

Primary Examiner — Hai Huynh
(74) Attorney, Agent, or Firm — Oliff PLC

(57) ABSTRACT

An object of the present invention is to suppress the dispersion of EGR gas amount between cylinders when the stuck open state arises in an EGR valve in an EGR apparatus for an internal combustion engine in which an EGR passage is branched on an intake system side into a plurality of EGR branch pipes, and the respective EGR branch pipes are connected respectively to intake branch pipes provided for the respective cylinders. In the present invention, if the EGR valve is stuck open, the exhaust pressure is reduced in an exhaust system of the internal combustion engine, while suppressing an amount of decrease in a driving force of a vehicle which carries the internal combustion engine within an allowable range.

11 Claims, 12 Drawing Sheets

EGR CONTROL SYSTEM FOR INTERNAL COMBUSTION ENGINE

TECHNICAL FIELD

The present invention relates to an EGR control system for an internal combustion engine.

BACKGROUND ART

Conventionally, an EGR apparatus is known, in which the exhaust gas of an internal combustion engine is introduced as the EGR gas into an intake system of the internal combustion engine. When the EGR gas is supplied to the internal combustion engine, it is possible to contemplate the reduction of NOx contained in the exhaust gas and the improvement in the mileage or fuel efficiency. In recent years, in order to further enhance the effect brought about by the supply of the EGR gas, a technique has been developed to further increase the supply amount of the EGR gas, for example, by increasing the diameter of the EGR passage.

In the case of the internal combustion engine provided with the EGR apparatus, if the failure or malfunction, in which the EGR valve provided for the EGR passage sticks or remains in a valve open state (hereinafter referred to as "stuck open"), arises, the EGR gas amount is excessively increased in some cases. If the EGR gas amount is excessively increased, it is feared to cause the accidental fire, the torque fluctuation, and the increase in the discharge amount of the unburned fuel component. Further, if it is contemplated to increase the EGR gas amount as described above, the problem as described above tends to arise more easily.

Patent Document 1 discloses a technique in which the valve operation is stopped in relation to some cylinders to perform the operation with a decreased number of cylinders when an EGR valve is stuck open in an internal combustion engine provided with an EGR apparatus. When the operation is performed with the decreased number of cylinders, it is possible to increase the intake air amount per one cylinder. As a result, it is possible to lower the EGR ratio.

PRIOR ART DOCUMENTS

Patent Documents

Patent Document 1: Japanese patent application laid-open No. 2005-207285;
Patent Document 2: Japanese patent application laid-open No. H11-022561;
Patent Document 3: Japanese patent application laid-open No. H09-217658;
Patent Document 4: Japanese patent application laid-open No.
Patent Document 5: Japanese patent application laid-open No. 2007-263050.

SUMMARY OF THE INVENTION

Problem to be Solved by the Invention

The EGR apparatus for the internal combustion engine, which is provided with a plurality of cylinders, is sometimes constructed such that an EGR passage is branched, on the side of an intake system, into a plurality of EGR branch pipes, and the respective EGR branch pipes are connected respectively to intake branch pipes which are provided for the respective cylinders. In the case of the EGR apparatus constructed as described above, an EGR valve is installed on the upstream side along the flow of the EGR gas as compared with the branched portion of the EGR passage.

In the case of such an arrangement, if the stuck open state arises in the EGR valve, and the EGR gas amount is excessively increased, then the EGR gas amount is greatly dispersed between the cylinders. As a result, the combustion state becomes unstable in each of the cylinders, and it is feared that any problem such as an accidental fire or the like may be caused.

The present invention has been made taking the foregoing problem into consideration, an object of which is to provide such a technique that the dispersion of the EGR gas amount between cylinders can be suppressed when an EGR valve is stuck open in an EGR apparatus for an internal combustion engine in which an EGR passage is branched into a plurality of EGR branch pipes on the side of an intake system and the respective EGR branch pipes are connected respectively to intake branch pipes provided for the respective cylinders.

Means for Solving the Problem

According to the present invention, the exhaust pressure is reduced when the stuck open state arises in an EGR valve.

In particular, according to the present invention, there is provided an EGR control system for an internal combustion engine, wherein:

the internal combustion engine comprises:
a plurality of cylinders;
a plurality of intake branch pipes which are formed by branching an intake passage and which are connected to the plurality of cylinders respectively; and
an EGR apparatus which has an EGR passage for making communication between an exhaust system and an intake system of the internal combustion engine and which has an EGR valve for controlling an amount of EGR gas allowed to flow through the EGR passage, wherein:
the EGR passage is branched into a plurality of EGR branch pipes on a side of the intake system, the respective EGR branch pipes are connected to the plurality of intake branch pipes respectively; and
the EGR valve is arranged on an upstream side along a flow of the EGR gas as compared with a branched portion of the EGR passage,
the EGR control system for the internal combustion engine further comprises:
stuck open state judging unit which judges whether or not the EGR valve sticks in a valve open state; and
exhaust pressure reducing unit which reduces an exhaust pressure in the exhaust system of the internal combustion engine, while suppressing an amount of decrease in a driving force of a vehicle which carries the internal combustion engine within an allowable range, if it is judged by the stuck open state judging unit that the EGR valve sticks in the valve open state.

In the present invention, the exhaust pressure is reduced when the stuck open state arises in the EGR valve. When the exhaust pressure is reduced, then it is possible to decrease the entire amount of the EGR gas, and it is also possible to decrease the influence of the exhaust gas pulsation on the EGR gas. As a result, it is possible to suppress the dispersion of the EGR gas amount between the cylinders. On the other hand, the control to reduce the exhaust pressure accompanies the decrease in the driving force of the vehicle in some cases. However, according to the present invention, the amount of decrease is suppressed within the allowable range. In this context, the allowable range is previously determined on the basis of, for example, an experiment.

The EGR control system for the internal combustion engine according to the present invention may further comprise an exhaust variable valve mechanism (exhaust variable valve timing mechanism) which controls a valve opening timing of an exhaust valve of the internal combustion engine. In this arrangement, the exhaust pressure reducing unit may reduce the exhaust pressure by retarding the valve opening timing of the exhaust valve within a range until arrival at a bottom dead center of an exhaust stroke by the exhaust variable valve mechanism. Accordingly, it is possible to reduce the exhaust pressure while suppressing the decrease in the engine torque of the internal combustion engine.

In this context, the exhaust variable valve mechanism may be such a mechanism that when the valve opening timing of the exhaust valve is changed, a valve closing timing of the exhaust valve is also changed in accordance therewith. The EGR control system for the internal combustion engine according to the present invention may further comprise an intake variable valve mechanism (intake variable valve timing mechanism) which controls a valve opening timing of an intake valve of the internal combustion engine.

When the exhaust variable valve mechanism is the mechanism as described above, if the valve opening timing of the exhaust valve is retarded in order to reduce the exhaust pressure, then the valve closing timing of the exhaust valve is also retarded. If the valve closing timing of the exhaust valve is retarded, the so-called valve overlap period, in which both of the intake valve and the exhaust valve are in the valve open states, is prolonged. If the valve overlap period is excessively prolonged, the influence of the exhaust gas pulsation, which is exerted on the intake gas, is increased.

In view of the above, the valve opening timing of the intake valve may be retarded by the intake variable valve mechanism when the exhaust pressure reducing unit retards the valve opening timing of the exhaust valve by the exhaust variable valve mechanism. Accordingly, it is possible to suppress the valve overlap period from being excessively prolonged. As a result, it is possible to decrease the influence of the exhaust gas pulsation on the intake gas.

In this context, the intake variable valve mechanism may be such a mechanism that when the valve opening timing of the intake valve is changed, a valve closing timing of the intake valve is also changed in accordance therewith. When the intake variable valve mechanism is the mechanism as described above, if the valve opening timing of the intake valve is retarded in order to shorten the valve overlap period, then the valve closing timing of the intake valve is also retarded. If the valve closing timing of the intake valve is retarded, the effective compression ratio (ratio between the volume of the combustion chamber and the volume in the cylinder provided when the intake valve is closed) is lowered. If the effective compression ratio is excessively lowered, it is feared that the combustion deterioration may be caused.

In view of the above, when the valve opening timing of the intake valve is retarded by the intake variable valve mechanism, an amount of retard may be decreased if the EGR valve, which is stuck open, has a small opening degree as compared with if the EGR valve, which is stuck open, has a large opening degree. Accordingly, the amount of retard of the valve closing timing of the intake valve is also decreased when the opening degree of the EGR valve which is stuck open is small as compared with when the opening degree of the EGR valve which is stuck open is large. Therefore, it is also possible to suppress any excessive decrease in the effective compression ratio, while suppressing the valve overlap period from being excessively prolonged.

The EGR control system for the internal combustion engine according to the present invention may further comprise air-fuel ratio control unit which controls an air-fuel ratio of an air-fuel mixture of the internal combustion engine. In this arrangement, the exhaust pressure reducing unit may reduce the exhaust pressure by raising the air-fuel ratio of the air-fuel mixture of the internal combustion engine by the air-fuel ratio control unit as compared with a reference air-fuel ratio which is an air-fuel ratio to be provided in a normal state.

When the air-fuel ratio of the air-fuel mixture of the internal combustion engine is made higher than the reference air-fuel ratio, it is possible to reduce the combustion pressure. As a result, it is possible to reduce the exhaust pressure. Further, when the air-fuel ratio of the air-fuel mixture is appropriately controlled, it is possible to suppress any excessive decrease in the engine torque of the internal combustion engine. Thus, the amount of decrease in the driving force of the vehicle can be suppressed within the allowable range.

In this context, when the opening degree of the EGR valve which is stuck open is relatively small, the amount of increase in the EGR gas is small. Therefore, it is enough to provide a small amount of reduction of the exhaust pressure in order to suppress the dispersion of the EGR gas amount between the cylinders. On the other hand, when the opening degree of the EGR valve which is stuck open is larger than a certain extent, the combustion state tends to become a more unstable state, because the amount of increase in the EGR gas amount is large. In this situation, if the air-fuel ratio of the air-fuel mixture of the internal combustion engine is excessively raised, it is feared that the combustion state may be further deteriorated.

In view of the above, the air-fuel ratio may be controlled within a low range if the opening degree of the EGR valve which is stuck open is not more than a first predetermined opening degree and if the opening degree is not less than a second predetermined opening degree which is larger than the first predetermined opening degree, as compared with if the opening degree is larger than the first predetermined opening degree and smaller than the second predetermined opening degree, when the air-fuel ratio of the air-fuel mixture of the internal combustion engine is raised as compared with the reference air-fuel ratio by the air-fuel ratio control unit in order to reduce the exhaust pressure.

In this context, the first predetermined opening degree may be a threshold value of the opening degree of the EGR valve with which it is possible to suppress the dispersion of the EGR amount between the cylinders within the allowable range even when the air-fuel ratio of the air-fuel mixture is not raised so much as when the opening degree of the EGR valve which is stuck open is larger than the first predetermined opening degree and smaller than the second predetermined opening degree. The second predetermined opening degree may be a threshold value of the opening degree of the EGR valve with which any further deterioration of the combustion state is caused if the air-fuel ratio of the air-fuel mixture is raised so much as when the opening degree of the EGR valve which is stuck open is larger than the first predetermined opening degree and smaller than the second predetermined opening degree.

It is also allowable that the larger the opening degree is, the higher the air-fuel ratio is, if the opening degree of the EGR valve which is stuck open is smaller than a predetermined opening degree, when the air-fuel ratio of the air-fuel mixture of the internal combustion engine is raised as compared with the reference air-fuel ratio by the air-fuel ratio control unit in order to reduce the exhaust pressure. Further, it is also allowable that the larger the opening degree is, the lower the air-fuel ratio is, if the opening degree of the EGR valve which is stuck open is not less than the predetermined opening degree.

In this case, the predetermined opening degree may be a threshold value of the opening degree of the EGR valve with which any further deterioration of the combustion state is caused if the air-fuel ratio of the air-fuel mixture is more raised as the opening degree of the EGR valve which is stuck open is larger.

When the EGR control system for the internal combustion engine according to the present invention further comprises an intake variable valve mechanism and air-fuel ratio control unit. the exhaust pressure reducing unit may reduce the exhaust pressure by retarding the valve closing timing of the intake valve by the intake variable valve mechanism, if an opening degree of the EGR valve which is stuck open is not more than a predetermined opening degree. Also in this arrangement, the exhaust pressure reducing unit may reduce the exhaust pressure by raising the air-fuel ratio of the air-fuel mixture of the internal combustion engine by the air-fuel ratio control unit as compared with a reference air-fuel ratio which is an air-fuel ratio in a normal state, if the opening degree of the EGR valve which is stuck open is larger than the predetermined opening degree.

As described above, when the valve closing timing of the intake valve is retarded, the effective compression ratio is lowered. As a result, the combustion pressure is lowered, and hence the exhaust pressure is lowered. However, if the amount of retard of the valve closing timing of the intake valve is increased, and the effective compression ratio is excessively lowered, then it is feared that the deterioration of combustion may be caused. Therefore, it is approved that the exhaust pressure is reduced by retarding the valve closing timing of the intake valve when the opening degree of the EGR valve which is stuck open is not more than the predetermined opening degree.

In this case, the predetermined opening degree may be a threshold value of the opening degree of the EGR valve with which it is possible to suppress the dispersion of the EGR gas amount between the cylinders within the allowable range while suppressing the excessive decrease in the effective compression ratio by retarding the valve closing timing of the intake valve.

In the arrangement as described above, it is approved that the predetermined opening degree is a first predetermined opening degree. In this case, the air-fuel ratio may be lowered if the opening degree of the EGR valve which is stuck open is not less than a second predetermined opening degree as compared with if the opening degree is smaller than the second predetermined opening degree, when the opening degree of the EGR valve which is stuck open is larger than the first predetermined opening degree, and the exhaust pressure reducing unit raises the air-fuel ratio of the air-fuel mixture of the internal combustion engine as compared with the reference air-fuel ratio by the air-fuel ratio control unit.

Also in this case, the second predetermined opening degree may be a threshold value of the opening degree of the EGR valve with which any further deterioration of the combustion state is caused if the air-fuel ratio of the air-fuel mixture is raised so much as when the opening degree of the EGR valve which is stuck open is larger than the first predetermined opening degree and smaller than the second predetermined opening degree, in the same manner as described above.

The present invention may be also applied to a vehicle which has a motor as a driving source in addition to the internal combustion engine. In this arrangement, the exhaust pressure reducing unit may reduce the exhaust pressure by decreasing an intake air amount of the internal combustion engine. When the intake air amount of the internal combustion engine is decreased, the engine torque of the internal combustion engine is lowered. However, the amount of decrease in the driving force of the vehicle can be suppressed within the allowable range by increasing an output torque of the motor.

In the present invention, the internal combustion engine may be constructed such that the plurality of cylinders is divided into those which are included in a plurality of cylinder groups. Further, the internal combustion engine may be constructed such that the EGR passage is connected on a side of the exhaust system to the exhaust system which corresponds to only a part of the cylinder group or groups of the plurality of cylinder groups. In the case of the arrangement as described above, it is possible to suppress the dispersion of the EGR gas amount between the cylinders, by reducing the exhaust pressure in the exhaust system to which the EGR passage is connected, when the stuck open state arises in the EGR valve.

Advantageous Effect of the Invention

According to the present invention, it is possible to suppress the dispersion of the EGR gas amount between the cylinders when the stuck open state arises in the EGR valve. As a result, it is possible to suppress the occurrence of, for example, any accidental fire.

EMBODIMENTS FOR CARRYING OUT THE INVENTION

A specified embodiment of the present invention will be explained below on the basis of the drawings. It is not intended that the technical scope of the invention is limited, for example, to only the sizes, the materials, the shapes, and the relative arrangements of the constitutive parts or components described in the embodiment of the present invention, unless otherwise specifically stated.

[First Embodiment]

A first embodiment of the present invention will be explained on the basis of FIGS. 1 to 4.

(Schematic Arrangement of Internal Combustion Engine and Intake/Exhaust System Thereof)

Figure 1:
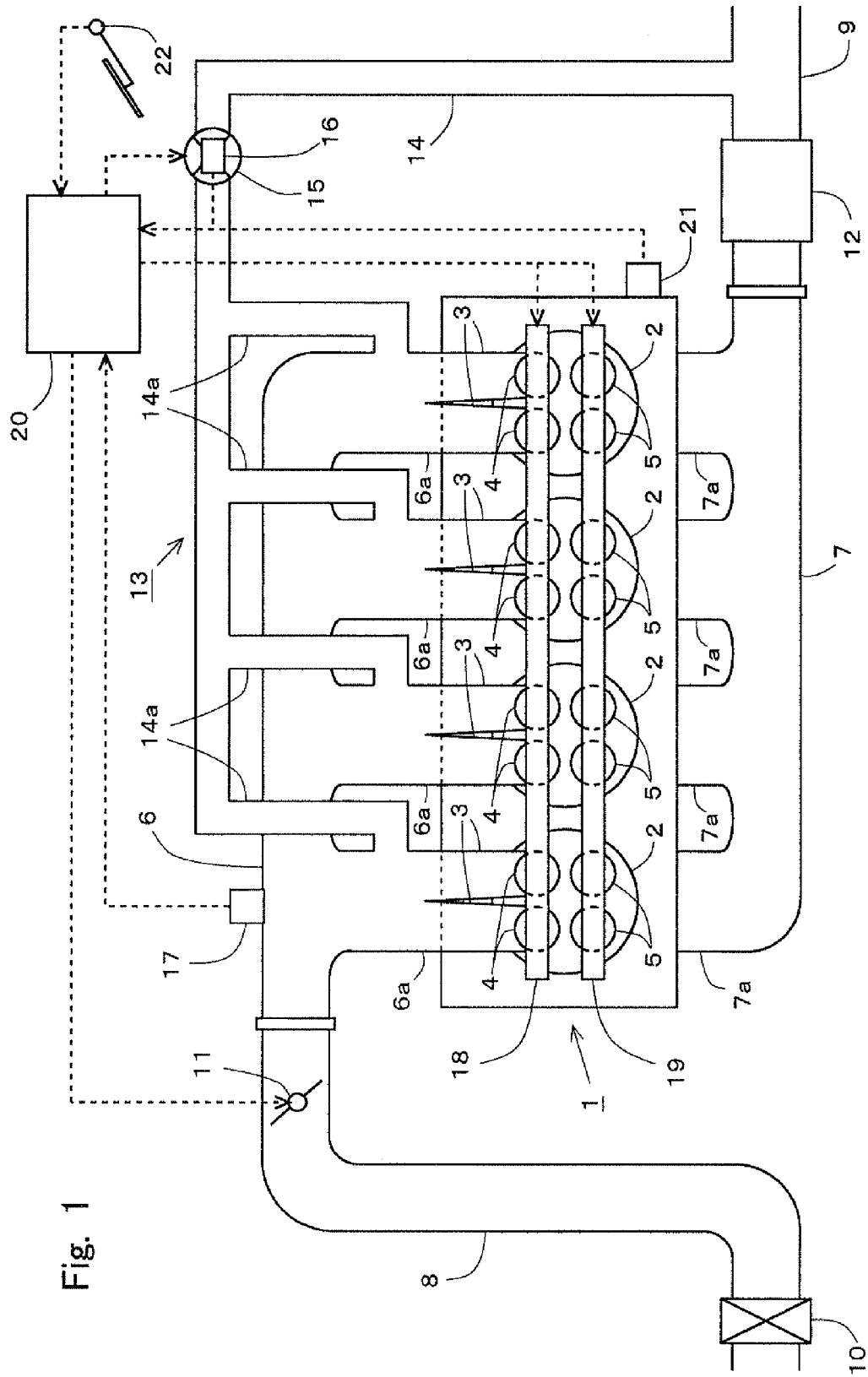
FIG. 1 shows a schematic arrangement of an internal combustion engine and an intake/exhaust system thereof according to a first embodiment.

FIG. 1 shows a schematic arrangement of an internal combustion engine and an intake/exhaust system thereof according to this embodiment. The internal combustion engine 1 is a gasoline engine which has four cylinders 2 for driving a vehicle. Intake ports 3 and exhaust ports (not shown) are connected to the respective cylinders 2. Openings of the intake ports 3 and the exhaust ports, which are open toward the inside of the cylinders 2, are opened/closed by intake valves 4 and exhaust valves 5 respectively. A fuel injection valve and a spark plug are provided for each of the cylinders 2 in the internal combustion engine 1 (not shown).

The internal combustion engine 1 is provided with an intake variable valve mechanism (intake variable valve timing mechanism) (hereinafter referred to as "intake VVT") and an exhaust variable valve mechanism (exhaust variable valve timing mechanism) (hereinafter referred to as "exhaust VVT") 19. The intake VVT 18 controls the valve opening timing and the valve closing timing of the intake valve 4. The exhaust VVT 19 controls the valve opening timing and the valve closing timing of the exhaust valve 5. Further, VVT's 18, 19 according to this embodiment are such mechanisms that the valve opening timing and the valve closing timing of the intake valve 4 or the exhaust valve 5 are simultaneously changed by the same amount (i.e., the phase of the valve timing is changed).

The respective intake ports 3 are connected to intake branch pipes 6a which are formed by branching an intake manifold 6. The respective exhaust ports are connected to exhaust branch pipes 7a which are formed by branching an exhaust manifold 7. An intake passage 8 is connected to the intake manifold 6. An exhaust passage 9 is connected to the exhaust manifold 7.

An air flow meter 10 and a throttle valve 11 are provided for the intake passage 8. An exhaust gas purification apparatus 12, which is constructed to include a three way catalyst, is provided for the exhaust passage 9.

Further, the internal combustion engine 1 is provided with an EGR apparatus 13 which introduces a part of the exhaust gas as the EGR gas into the intake system. The EGR apparatus 13 has an EGR passage and an EGR valve 15. The EGR passage 14 is connected on the side of the exhaust system to the portion of the exhaust passage 9 which is disposed on the downstream side from the exhaust gas purification apparatus 12. The portion of the EGR passage 14, which is disposed on the side of the intake system, is branched into four EGR branch pipes 14a. The respective EGR branch pipes 14a are connected to the intake branch pipes 6a respectively. The EGR valve 15 is arranged on the upstream side along the flow of the EGR gas as compared with the branched portion of the EGR passage 14. Further, the EGR valve 15 is provided with an EGR valve opening degree sensor 16 for detecting the opening degree thereof.

The internal combustion engine 1 is provided in combination with an electronic control unit (ECU) 20. ECU is a unit which controls, for example, the operation state of the internal combustion engine 1. Various sensors, which include, for example, an intake pressure sensor 17, a crank position sensor 21, and an accelerator opening degree sensor 22, are electrically connected to ECU 20 in addition to the air flow meter 10 and the EGR valve opening degree sensor 16. The intake pressure sensor 17 detects the intake pressure in the intake manifold 6. The crank position sensor 21 detects the crank angle of the internal combustion engine 1. The accelerator opening degree sensor 22 detects the accelerator opening degree of the vehicle which carries the internal combustion engine 1.

Output signals of the various sensors are inputted into ECU 20. ECU 20 calculates the engine rotation speed of the internal combustion engine 1 on the basis of the detected value of the crank position sensor 21. ECU 20 calculates the engine torque of the internal combustion engine 1 on the basis of the detected value of the accelerator opening degree sensor 22.

Further, the fuel injection valve of each of the cylinders 2, the spark plug, the intake VVT 18, the exhaust VVT 19, the throttle valve 11, and the EGR valve 15 are electrically connected to ECU 20. Thus, these components are controlled by ECU 20.

(Control of EGR Valve in Stuck Open State)

In this embodiment, a part of the exhaust gas allowed to flow through the exhaust passage 9 is introduced as the EGR gas into the respective exhaust branch pipes 6a via the EGR passage 14 and the EGR branch pipes 14a, and the EGR gas is supplied to the respective cylinders 2 together with the intake air.

On the other hand, the EGR gas amount introduced into the respective intake branch pipes 6a via the EGR passage 14 and the EGR branch pipes 14a, i.e., the EGR gas amount supplied to the respective cylinders 2 is controlled by adjusting the opening degree of the EGR valve 15. Usually, the opening degree of the EGR valve 15 is adjusted so that the EGR ratio of the intake gas supplied to the respective cylinders 2 has the optimum value corresponding to the operation state of the internal combustion engine 1.

In this context, if the stuck open state arises in the EGR valve 15, the EGR gas amount is excessively increased in some cases. As a result, if a state, in which the EGR ratio is excessively high with respect to the operation state of the internal combustion engine 1, is caused, it is feared that the combustion state may become unstable in the cylinder 2. If the combustion state becomes unstable in the cylinder 2, there is such a possibility that any problem may arise in relation to, for example, the accidental fire, the torque fluctuation, and the increase in the discharge amount of the unburned fuel component.

In this embodiment, the EGR gas is supplied to each of the cylinders via each of the EGR branch pipes 14a and the intake branch pipes Ga. Therefore, if the difference in the combustion pressure between the cylinders and/or the fluctuation of the exhaust gas pulsation is/are increased due to the excessive increase in the EGR gas amount, the dispersion of the EGR gas amount is increased between the cylinders. If the dispersion is increased, the deterioration of the combustion state tends to arise in the cylinder 2.

Figure 2:
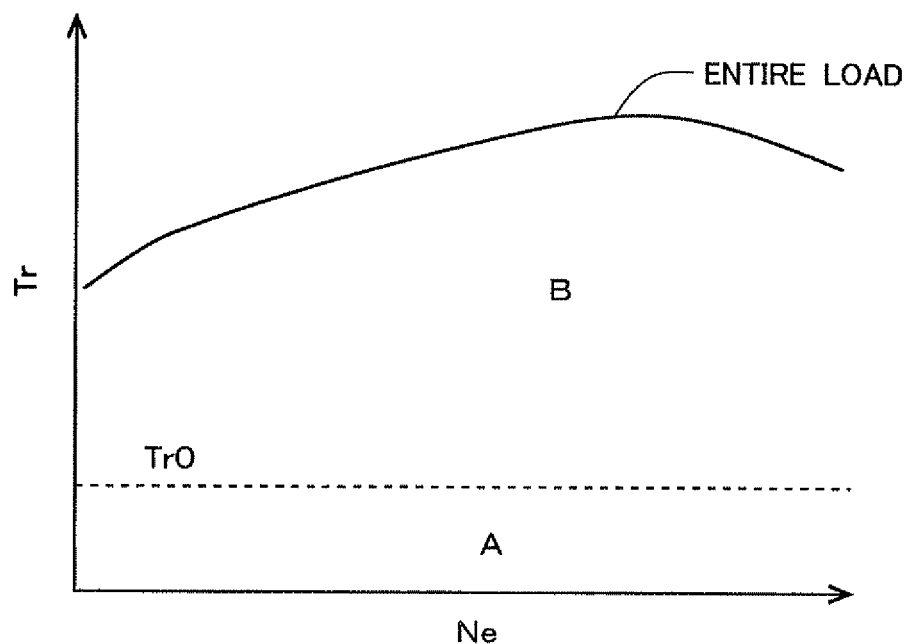
FIG. 2 shows the operation area of the internal combustion engine according to the first embodiment.

In order to avoid the problem as described above, in this embodiment, the following control is carried out corresponding to the operation state of the internal combustion engine 1, if the stuck open state arises in the EGR valve 15. FIG. 2 shows the operation area of the internal combustion engine according to the this embodiment. With reference to FIG. 2, the vertical axis represents the engine torque Tr, and the horizontal axis represents the engine rotation speed Ne.

The exhaust pressure is relatively low in the exhaust passage 9 in the operation area A in which the engine torque Tr is not more than a predetermined torque TrO. Therefore, if the EGR valve 15 is stuck open in this area, then the amount of increase in the entire amount of the EGR gas is small, and the dispersion of the EGR gas amount between the cylinders is small as well.

Accordingly, in this embodiment, if the EGR valve 15 is stuck open when the engine torque Tr of the internal combustion engine 1 is not more than the predetermined torque TrO, then the increase in the opening degree of the throttle valve 11 and/or the advance of the ignition timing in each of the cylinders 2 is/are carried out (this control is hereinafter referred to as "first stuck open state control"). When the opening degree of the throttle valve 11 is increased to increase the intake air amount, it is possible to suppress the excessive increase in the EGR ratio. Further, when the ignition timing is advanced, it is possible to supplement the decrease in the combustion speed accompanied by the increase in the EGR gas amount. Therefore, it is possible to suppress the deterioration of the combustion state by carrying out the first stuck open state control. In the first stuck open state control, the amount of increase in the opening degree of the throttle valve 11 and the amount of advance of the ignition timing are determined depending on the opening degree of the stuck open EGR valve 15.

On the other hand, the exhaust pressure is relatively high in the exhaust passage 9 in the operation area B in which the engine torque Tr is larger than the predetermined torque TrO. Therefore, if the EGR valve 15 is stuck open in this area, then the amount of increase in the entire amount of the EGR gas is large, and the dispersion of the EGR gas amount between the cylinders is large as well. In this case, if the intake air amount is increased in order to suppress the excessive increase in the EGR ratio, then the combustion pressure is greatly raised, and the exhaust pressure is also greatly increased in accordance therewith. Therefore, it is feared that the dispersion of the EGR gas amount between the cylinders may be more increased. Further, if the amount of increase in the EGR gas amount is large, it is sometimes difficult to secure the combustion even when the ignition timing is advanced. In other words, if the EGR valve 15 is stuck open when the engine torque Tr of the internal combustion engine 1 is larger than the predetermined torque TrO, it is difficult to sufficiently suppress the deterioration of the combustion state by the first stuck open state control.

In view of the above, in this embodiment, if the EGR valve 15 is stuck open in this area, the valve opening timing of the exhaust valve 5, which is provided before the bottom dead center of the exhaust stroke in the ordinary situation, is retarded within a range until arrival at the bottom dead center of the exhaust stroke by the exhaust VVT 19. If the valve opening timing of the exhaust valve 5 is retarded, the exhaust valve 5 is opened in a state in which the pressure in the cylinder 2 is more lowered. Therefore, it is possible to reduce the exhaust pressure. When the exhaust pressure is reduced, then it is possible to decrease the entire amount of the EGR gas, and it is also possible to decrease the influence of the exhaust gas pulsation on the EGR gas. As a result, it is possible to suppress the dispersion of the EGR gas amount between the cylinders. Further, according to this method, it is possible to reduce the exhaust pressure while suppressing the decrease in the engine torque. In other words, it is possible to suppress the amount of decrease in the driving force of the vehicle within an allowable range.

(Control Flow)

Figure 3:
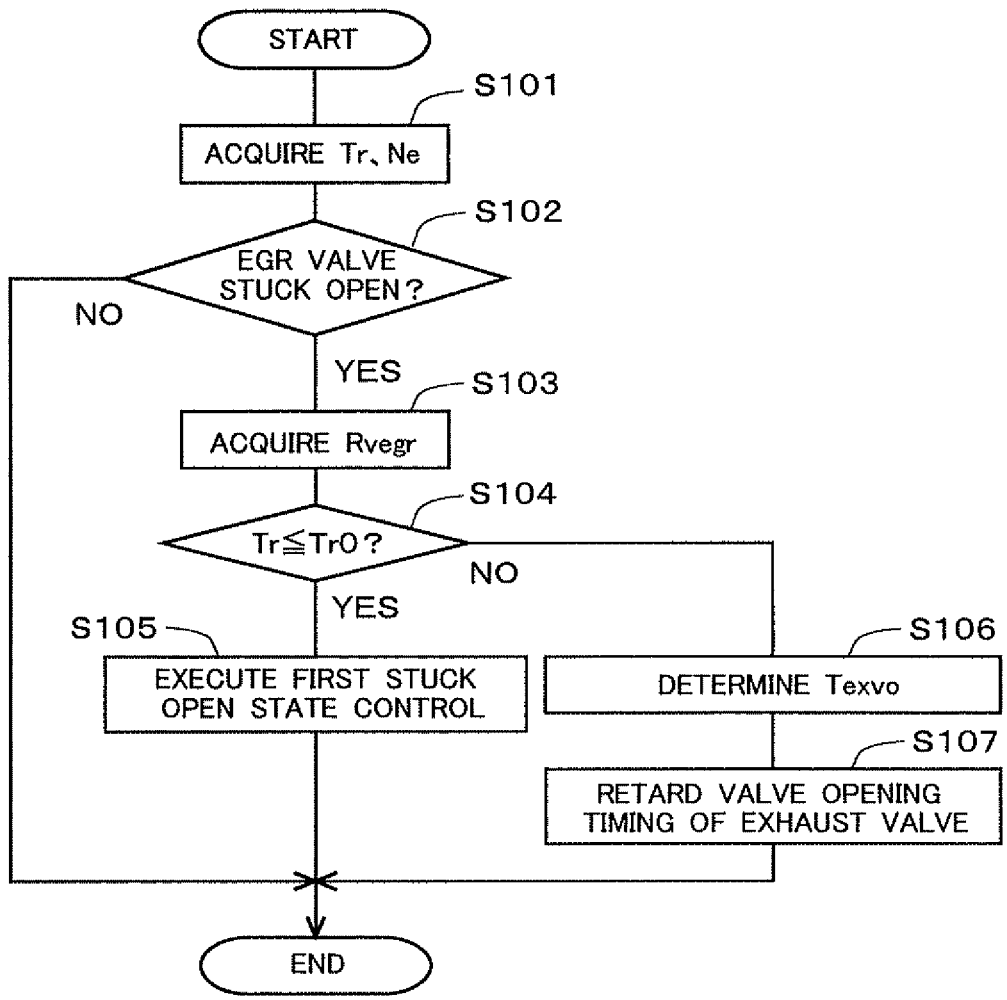
FIG. 3 shows a flow chart illustrating a control flow to be used when the stuck open state arises in an EGR valve according to the first embodiment.

An explanation will be made below on the basis of a flow chart shown in FIG. 3 about a control flow to be used when the stuck open state arises in the EGR valve according to this embodiment. This flow is previously stored in ECU 20, and this flow is repeatedly executed at predetermined intervals by ECU 20.

In this flow, at first, in Step S101, the engine torque Tr and the engine rotation speed Ne of the internal combustion engine 1 are acquired.

Subsequently, in Step S102, it is judged whether or not the EGR valve 15 is stuck open on the basis of the detected value of the EGR valve opening degree sensor 16. In this context, if the EGR valve 15 is stuck open, and the EGR gas amount is any amount different from the target amount, then the intake pressure in the intake manifold 6 has a value different from the target value. Accordingly, it is also allowable to judge whether or not the EGR valve 15 is stuck open on the basis of the detected value of the intake pressure sensor 17 in place of the detected value of the EGR valve opening degree sensor 16. If the affirmative judgment is made in Step S102, the process of Step S103 is subsequently executed. If the negative judgment is made, the execution of this routine is once completed.

In Step S103, the opening degree Rvegr of the stuck open EGR valve 15 is acquired.

In Step S104, it is judged whether or not the engine torque Tr is not more than the predetermined torque TrO. It is noted that the predetermined torque TrO resides in the value which is previously determined on the basis of, for example, an experiment, as the threshold value of the area in which the deterioration of the combustion state can be sufficiently suppressed by the first stuck open state control when the EGR valve 15 is stuck open. If the affirmative judgment is made in Step S104, the process of Step S105 is subsequently executed. If the negative judgment is made, the process of Step S106 is subsequently executed.

Subsequently, in Step S105, the first stuck open state control is executed. In this procedure, whether any one of the opening degree increase control of the throttle valve 11 and the ignition timing retard control is executed or both of them are executed is determined on the basis of the operation state of the internal combustion engine 1 and the opening degree Rvegr of the EGR valve 15. Further, the amount of increase in the opening degree of the throttle valve 11 and the amount of retard of the ignition timing are also determined on the basis of the operation state of the internal combustion engine 1 and the opening degree Rvegr of the EGR valve 15. After that, the execution of this flow is once stopped.

In Step S106, the target valve opening timing Texvo, which is provided when the valve opening timing of the exhaust valve 5 is retarded in Step S107 as described later on, is determined on the basis of the operation state of the internal combustion engine 1 and the opening degree Rvegr of the EGR valve 15. The relationship among the target valve opening timing Texvo of the exhaust valve 5, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the more delayed the target valve opening timing Texvo is. In other words, the larger the opening degree Rvegr of the EGR valve 15 is, the larger the amount of retard of the valve opening timing of the exhaust valve 5 is. In the map, the target valve opening timing Texvo is the timing provided before arrival at the bottom dead center of the exhaust stroke.

Subsequently, in Step S107, the valve opening timing of the exhaust valve 5 is retarded by the exhaust VVT 19 to the target valve opening timing Texvo. After that, the execution of this flow is once stopped.

In this embodiment, when a sensor for detecting the exhaust pressure or the combustion pressure is provided, is also allowable that the valve opening timing of the exhaust valve 5 is controlled so that the detected value of the sensor is the target value when the valve opening timing of the exhaust valve 5 is retarded.

In this embodiment, the amount of retard or the target valve opening timing, which is used when the valve opening timing of the exhaust valve 5 is retarded in order to reduce the exhaust pressure, may be a constant value. For example, the retard control of the valve opening timing of the exhaust valve may be such control that the valve opening timing of the exhaust valve 5 is retarded to the bottom dead center of the exhaust stroke when the stuck open state of the EGR valve 15 arises.

In this embodiment, even if the EGR valve 15 is stuck open when the operation state of the internal combustion engine 1 belongs to the area A shown in FIG. 2, then the dispersion of the EGR gas amount between the cylinders may be suppressed by executing the retard control of the valve opening timing of the exhaust valve 5, in the same manner as in the case in which the operation state belongs to the area B shown in FIG. 2. Further, even if the EGR valve 15 is stuck open when the operation state of the internal combustion engine 1 belongs to the area B shown in FIG. 2, then the first stuck open state control may be executed in addition to the retard control of the valve opening timing of the exhaust valve 5.

In this embodiment, ECU 20, which executes Step S102 in the flow described above, corresponds to the stuck open state judging unit according to the present invention. ECU 20, which executes Step S107 in the flow described above, corresponds to the exhaust pressure reducing unit according to the present invention.

(Modified Embodiment)

Next, a modified embodiment of the embodiment of the present invention will be explained. If the valve opening timing of the exhaust valve 5 is retarded by the exhaust VVT 19 in order to reduce the exhaust pressure as described above, the valve closing timing of the exhaust valve 5 is retarded by the same amount. If the valve closing timing of the exhaust valve 5 is retarded, the valve overlap period, in which both of the intake valve 4 and the exhaust valve 5 are in the valve open states, is prolonged. If the valve overlap period is excessively prolonged, the influence of the exhaust gas pulsation on the intake gas is increased. As a result, it is feared that the deterioration of the combustion state may be caused.

In view of the above, in this modified embodiment, when the valve opening timing of the exhaust valve 5 is retarded, the valve opening timing of the intake valve 4 is retarded by the intake VVT 18. Accordingly, it is possible to suppress the valve overlap period from being excessively prolonged. Therefore, it is possible to decrease the influence of the exhaust gas pulsation on the intake gas.

(Control Flow)

Figure 4:
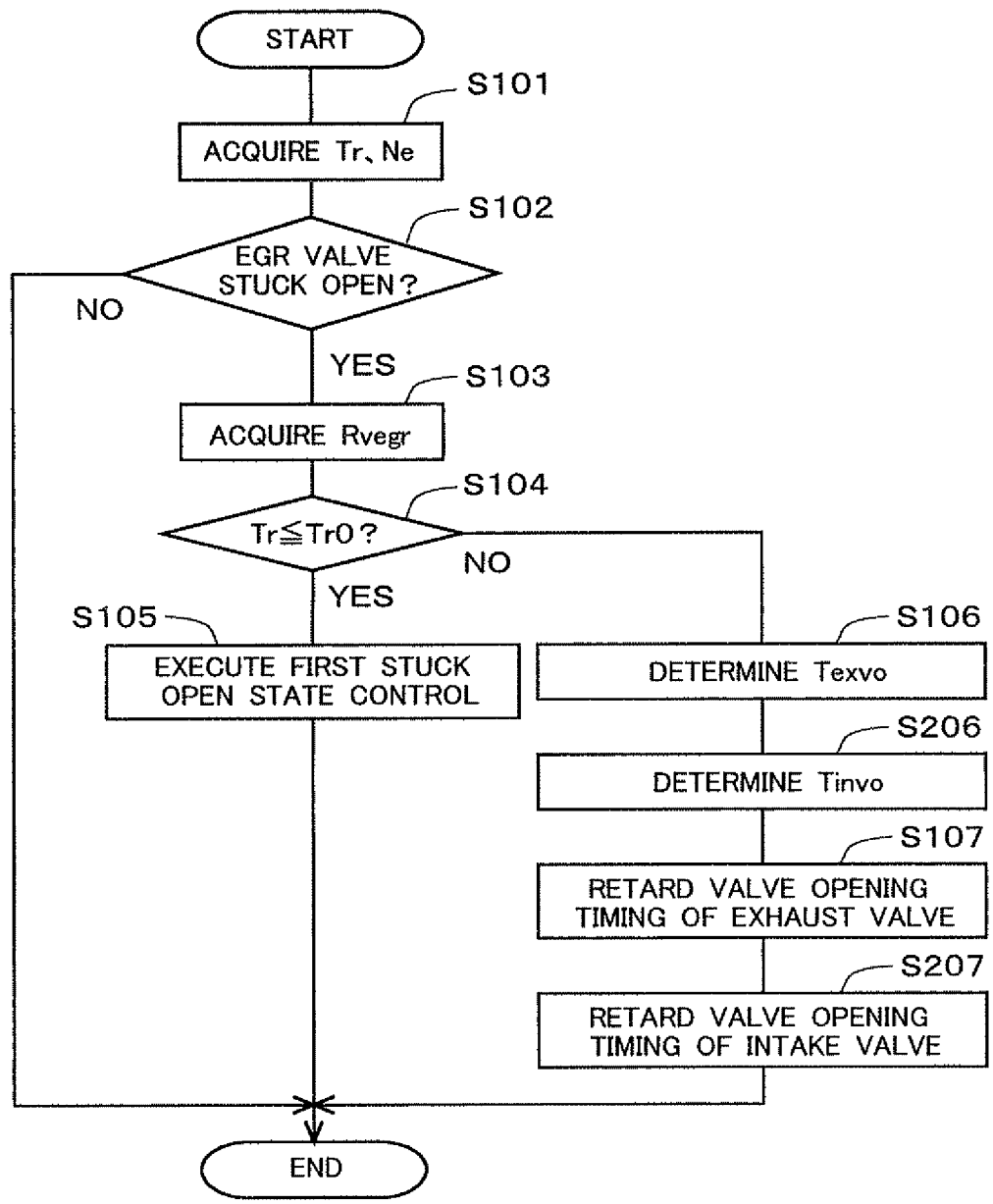
FIG. 4 shows a flow chart illustrating a control flow to be used when the stuck open state arises in an EGR valve according to a modified embodiment of the first embodiment.

An explanation will be made below on the basis of a flow chart shown in FIG. 4 about a control flow to be used when the stuck open state arises in the EGR valve according to this modified embodiment. This flow is previously stored in ECU 20, and this flow is repeatedly executed at predetermined intervals by ECU 20. The steps, which are the same as those of the flow shown in FIG. 3, are designated by the same reference numerals, any explanation of which will be omitted.

In this flow, in Step S206, the target valve opening timing Tinvo, which is adopted when the valve opening timing of the intake valve 4 is retarded in Step S207 as described later on, is determined on the basis of the operation state of the internal combustion engine 1 and the opening degree Rvegr of the EGR valve 15. The relationship among the target valve opening timing Tinvo of the intake valve 4, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the more delayed the target valve opening timing Tinvo is. In other words, the larger the opening degree Rvegr of the EGR valve 15 is, the larger the amount of retard of the valve opening timing of the intake valve 4 is.

In Step S207, the valve opening timing of the intake valve 4 is retarded to the target valve opening timing Tinvo by the intake VVT 18. After that, the execution of this flow is once stopped.

In this embodiment, if the valve opening timing of the intake valve 4 is retarded by the intake VVT 18, the valve closing timing of the intake valve 4 is retarded by the same amount. However, if the valve closing timing of the intake valve is retarded, the effective compression ratio (ratio between the volume of the combustion chamber and the volume in the cylinder 2 provided when the intake valve 4 is closed) is lowered. If the effective compression ratio is excessively lowered, it is feared that the deterioration of the combustion state may be caused. In view of the above, in the flow described above, the target valve opening timing Tinvo of the intake valve 4 is determined as in Step S206. Accordingly, the amount of retard of the valve opening timing of the intake valve 4 is decreased when the opening degree of the stuck open EGR valve 15 is small as compared with when the opening degree is large. Thus, it is possible to decrease the amount of retard of the valve closing timing of the intake valve 4 when the opening degree of the EGR valve 15 is small as compared with when the opening degree is large. Therefore, it is possible to suppress the excessive decrease in the effective compression ratio while suppressing the valve overlap period from being excessively prolonged.

A mechanism, in which the valve opening timing and the valve closing timing of the exhaust valve 5 can be changed independently from each other, may be adopted as the exhaust VVT 19 according to this embodiment. In this case, when the valve opening timing of the exhaust valve 5 is retarded in order to lower the exhaust pressure, it is possible to retard only the valve opening timing without changing the valve closing timing of the exhaust valve 5. Therefore, it is unnecessary to perform the control of the valve opening timing of the intake valve 4 as performed in the modified embodiment described above.

A mechanism, in which the valve opening timing and the valve closing timing of the intake valve 4 can be changed independently from each other, may be adopted as the intake VVT 18 according to this embodiment. In this case, when the valve opening timing of the intake valve 4 is retarded in order to suppress the length of the valve overlap period in accordance with the retard of the valve closing timing of the exhaust valve 5 as in the modified embodiment described above, it is possible to retard only the valve opening timing without changing the valve closing timing of the intake valve 4.

[Second Embodiment]

Figure 5:
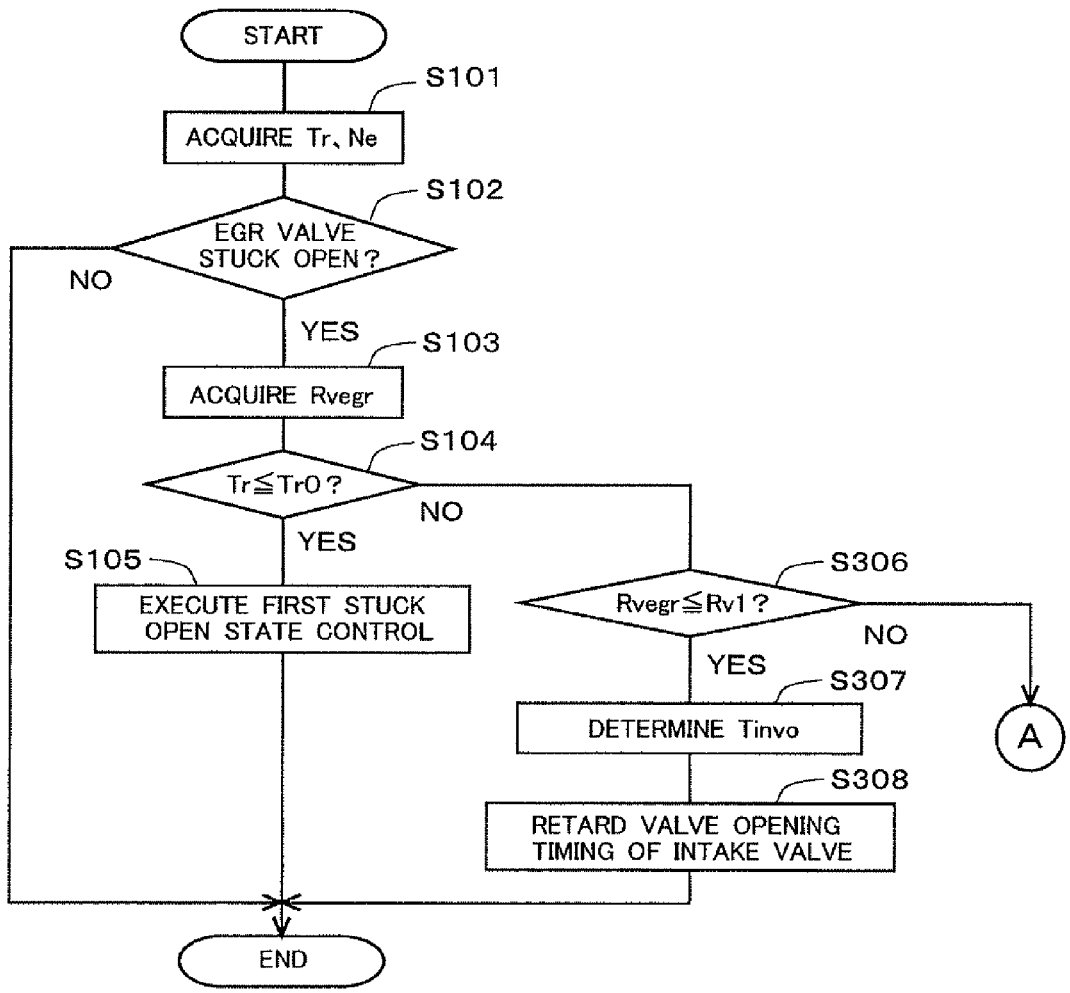
FIG. 5 shows a flow chart illustrating a part of a control flow to be used when the stuck open state arises in an EGR valve according to a second embodiment.
Figure 6:
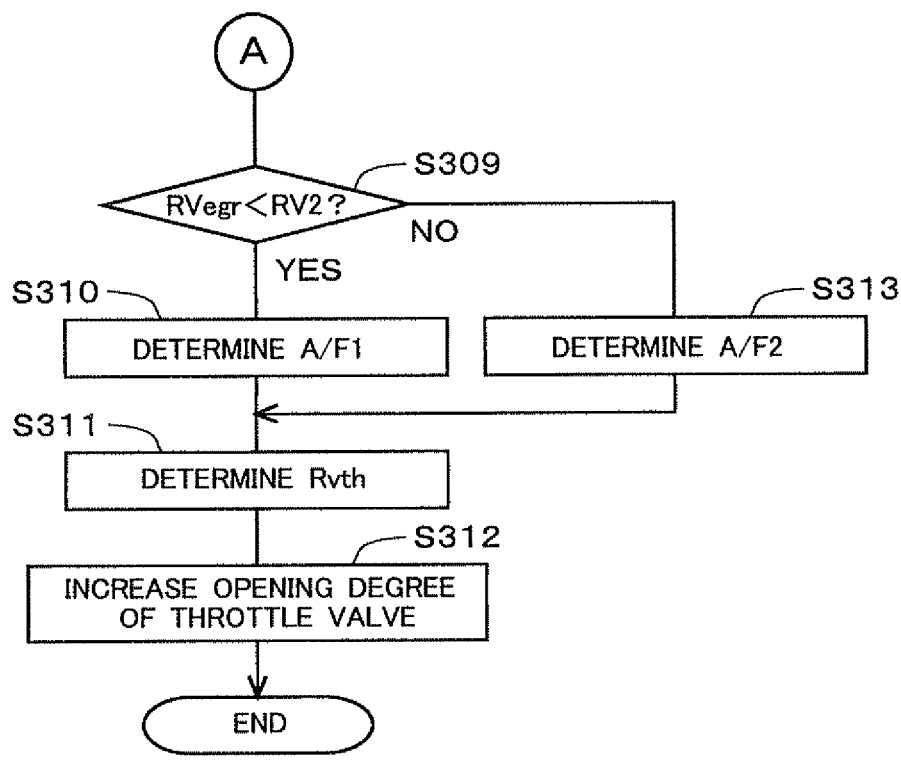
FIG. 6 shows a flow chart illustrating another part of the control flow to be used when the stuck open state arises in the EGR valve according to the second embodiment.
Figure 7:
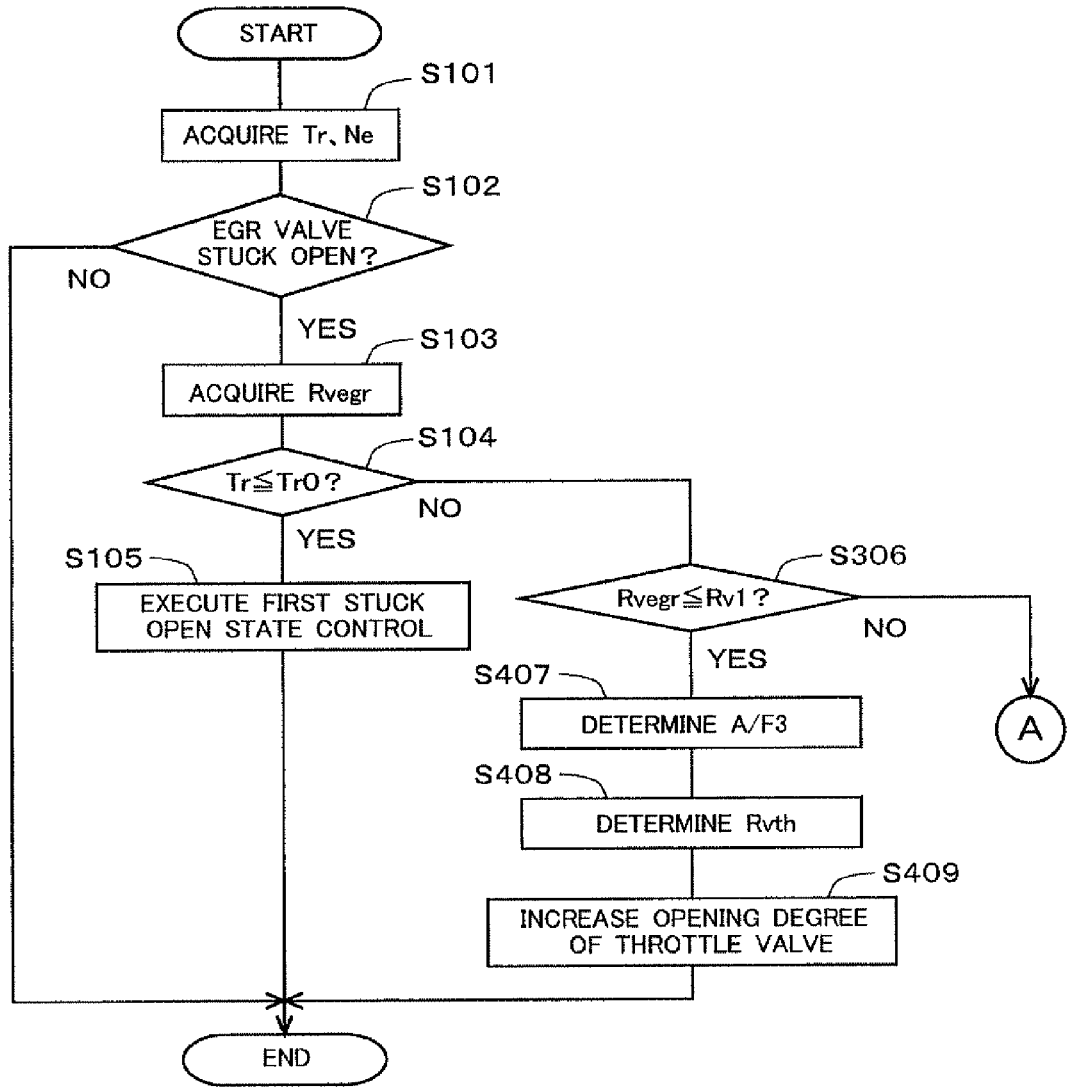
FIG. 7 shows a flow chart illustrating a part of a control flow to be used when the stuck open state arises in an EGR valve according to a first modified embodiment of the second embodiment.

A second embodiment of the present invention will be explained on the basis of FIGS. 5 to 7. In this section, an explanation will be made about only features or points different from those of the first embodiment.

(Control of EGR Valve in Stuck Open State)

Also in this embodiment, if the EGR valve 15 is stuck open when the operation state of the internal combustion engine 1 belongs to the operation area B shown in FIG. 2, the increase in the entire amount of the EGR gas and the dispersion of the EGR gas amount between the cylinders are suppressed by reducing the exhaust pressure in the exhaust passage 9 in the same manner as in the first embodiment. However, a method for reducing the exhaust passage is different from that adopted in the first embodiment.

An explanation will be made below about the method for reducing the exhaust pressure adopted when the EGR valve 15 is stuck open according to this embodiment. In this embodiment, if the opening degree of the stuck EGR valve 15 is not more than a first predetermined opening degree, the exhaust pressure is reduced by retarding the valve closing timing of the intake valve 4 by the intake VVT 18. As described above, if the valve closing timing of the intake valve 4 is retarded, the effective compression ratio is lowered. As a result, the combustion pressure is lowered, and the exhaust pressure is reduced.

In this context, if the opening degree of the stuck EGR valve 15 is large, it is necessary to increase the amount of decrease in the effective compression ratio by increasing the amount of retard of the valve closing timing of the intake valve 4 in order to sufficiently decrease the dispersion of the EGR gas amount between the cylinders. However, as described above, if the effective compression ratio is excessively lowered, it is feared that the deterioration of the combustion may be caused. In view of the above, in this embodiment, the exhaust pressure is reduced by retarding the valve closing timing of the intake valve when the opening degree of the stuck open EGR valve is not more than the first predetermined opening degree. In this context, the first predetermined opening degree is a threshold value of the opening degree of the EGR valve 15 with which the dispersion of the EGR gas amount between the cylinders can be suppressed within an allowable range while suppressing the effective compression ratio from being excessively lowered, by retarding the valve closing timing of the intake valve 4.

If the opening degree of the stuck EGR valve 15 is larger than the first predetermined opening degree, then the air-fuel ratio of the air-fuel mixture of the internal combustion engine 1 is made higher than the reference air-fuel ratio which is the air-fuel ratio in the normal state (theoretical air-fuel ratio or any air-fuel ratio in the vicinity of the theoretical air-fuel ratio in this embodiment), and thus the exhaust pressure is reduced. When the air-fuel ratio of the air-fuel mixture is made higher than the reference air-fuel ratio, it is possible to reduce the combustion pressure. As a result, it is possible to reduce the exhaust pressure.

In this procedure, if the opening degree of the stuck open EGR valve 15 is larger than a certain extent, the combustion state tends to become a more unstable state, because the amount of increase in the EGR gas amount is large. If the air-fuel ratio of the air-fuel mixture is greatly raised in such a situation, it is feared that the combustion state may be further deteriorated. In view of the above, the air-fuel ratio of the air-fuel mixture is controlled within a lower range if the opening degree of the stuck EGR valve 15 is not less than a second predetermined opening degree which is larger than the first predetermined opening degree as compared with if the opening degree is smaller than the second predetermined opening degree, when the air-fuel ratio of the air-fuel mixture is made higher than the reference air-fuel ratio in order to reduce the exhaust pressure. In this context, the second predetermined opening degree is a threshold value of the opening degree of the EGR valve 15 with which any further deterioration of the combustion state is caused if the air-fuel ratio of the air-fuel mixture is raised so much as when the opening degree of the stuck open EGR valve 15 is larger than the first predetermined opening degree and smaller than the second predetermined opening degree.

The first and second predetermined opening degrees are previously determined on the basis of, for example, an experiment, and the first and second predetermined opening degrees are stored in ECU 20. The first and second predetermined opening degrees may be changed depending on the operation state of the internal combustion engine 1.

According to the method as described above, it is possible to reduce the exhaust pressure without accompanying the excessive decrease in the engine torque, i.e., while suppressing the amount of decrease in the driving force of the vehicle within the allowable range.

(Control Flow)

An explanation will be made below on the basis of flow charts shown in FIGS. 5 and 6 about a control flow to be used when the stuck open state arises in the EGR valve according to this embodiment. This flow is previously stored in ECU 20, and this flow is repeatedly executed at predetermined intervals by ECU 20. The steps, which are the same as those of the flow shown in FIG. 3, are designated by the same reference numerals, any explanation of which will be omitted.

In this flow, if the negative judgment is made in Step S104, the process of Step S306 is subsequently executed. In Step S306, it is judged whether or not the opening degree Rvegr of the EGR valve 15 is not more than the first predetermined opening degree Rv1. If the affirmative judgment is made in Step S306, the process of Step S307 is subsequently executed. If the negative judgment is made, the process of Step S309 is subsequently executed.

In Step S307, the target valve closing timing Tinvc, which is used when the valve closing timing of the, intake valve 4 is retarded in Step S308 as described later on, is determined on the basis of the operation state of the internal combustion engine 1 and the opening degree Rvegr of the EGR valve 15. The relationship among the target valve closing timing Tinvc of the intake valve 4, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the more delayed the target valve closing timing Tinvc is. In other words, the larger the opening degree Rvegr of the EGR valve 15 is, the larger the amount of retard of the valve closing timing of the intake valve 4 is. In the map, the target valve closing timing Tinvc is set so that the amount of decrease in the engine torque of the internal combustion engine 1 is within an allowable range, i.e., the amount of decrease in the driving force of the vehicle which carries the internal combustion engine 1 is within an allowable range.

Subsequently, in Step S308, the valve closing timing of the intake valve 4 is retarded to the target valve closing timing Tinvc determined in Step S307, by the intake VVT 18. After that, the execution of this flow is once stopped.

On the other hand, in Step S309, it is judged whether or not the opening degree Rvegr of the EGR valve 15 is smaller than the second predetermined opening degree Rv2. If the affirmative judgment is made in Step S309, the process of Step S310 is subsequently executed. If the negative judgment is made, the process of Step S313 is subsequently executed.

In Step S310, the target air-fuel ratio A/F1, which is used when the air-fuel ratio of the air-fuel mixture is raised by increasing the opening degree of the throttle valve 11 in Step S312 as described later on, is determined on the basis of the operation state of the internal combustion engine 1 and the opening degree Rvegr of the EGR valve 15. The relationship among the target air-fuel ratio A/F1, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the higher the target air-fuel ratio A/F1 is.

Subsequently, in Step S311, the target throttle valve opening degree Rvth, which is the opening degree of the throttle valve 11 at which the air-fuel ratio of the air-fuel mixture is the target air-fuel ratio A/F1, is determined.

Subsequently, in Step S312, the opening degree of the throttle valve 11 is increased to the target throttle valve opening degree Rvth. Accordingly, the intake air amount is increased, and the air-fuel ratio of the air-fuel mixture is raised to the target air-fuel ratio A/F1.

In Step S313, the target air-fuel ratio A/F2, which is used when the air-fuel ratio of the air-fuel mixture is raised by increasing the opening degree of the throttle valve 11 in Step S312 as described later on, is determined on the basis of the operation state of the internal combustion engine 1 and the opening degree Rvegr of the EGR valve 15. The relationship among the target air-fuel ratio A/F2, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the lower the target air-fuel ratio A/F2 is.

The map, which is used to determine the target air-fuel ratio A/F1 in Step S310, is provided distinctly from the map which is used to determine the target air-fuel ratio A/F2 in Step S313. In these maps, there is given "reference air-fuel ratio<A/F2<A/F1". In these maps, the target air-fuel ratios A/F1 and A/F2 are set so that the amount of decrease in the engine torque of the internal combustion engine 1 is within an allowable range, i.e., the amount of decrease in the driving force of the vehicle which carries the internal combustion engine 1 is within an allowable range.

Subsequently, in Step S311, the target throttle valve opening degree Rvth, which is the opening degree of the throttle valve 11 at which the air-fuel ratio of the air-fuel mixture is the target air-fuel ratio A/F2, is determined.

Subsequently, in Step S312, the opening degree of the throttle valve 11 is increased to the target throttle valve opening degree Rvth. Accordingly, the intake air amount is increased, and the air-fuel ratio of the air-fuel mixture is raised to the target air-fuel ratio A/F2.

In this embodiment, when a sensor for detecting the exhaust pressure or the combustion pressure is provided, it is also allowable that the valve closing timing of the intake valve 4 or the opening degree of the throttle valve 11 is controlled so that the detected value of the sensor is the target value when the valve closing timing of the intake valve 4 is retarded or when the opening degree of the throttle valve 11 is increased.

In this embodiment, it is also allowable to provide a constant value for the target valve closing timing or the amount of retard when the valve closing timing of the intake valve 4 is retarded in order to reduce the exhaust pressure. Further, the target air-fuel ratio or the amount of increase, which is used when the air-fuel ratio of the internal combustion engine 1 is raised as compared with the reference air-fuel ratio in order to reduce the exhaust pressure, may be a constant value when the opening degree of the stuck open EGR valve 15 is smaller than the second predetermined opening degree Rv2 and when the opening degree is not less than the second predetermined opening degree Rv2 respectively. Also in this case, the respective values are set so that the amount of decrease in the engine torque of the internal combustion engine 1 is within the allowable range. The target air-fuel ratios A/F1 and A/F2 are set so that there is given "reference air-fuel ratio<A/F2<A/F1".

In this embodiment, even if the EGR valve 15 is stuck open when the operation state of the internal combustion engine 1 belongs to the area A shown in FIG. 2, the dispersion of the EGR gas amount between the cylinders may be suppressed by executing the retard control of the valve closing timing of the intake valve 4 or the increase control of the air-fuel ratio of the air-fuel mixture, in the same manner as in the case in which the operation state belongs to the area B shown in FIG. 2. Even if the EGR valve 15 is stuck open when the operation state of the internal combustion engine 1 belongs to the area B shown in FIG. 2, the first stuck open state control may be executed in addition to the retard control of the valve closing timing of the intake valve 4 or the increase control of the air-fuel ratio of the air-fuel mixture.

In this embodiment, the throttle valve 11 corresponds to the air-fuel ratio control unit according to the present invention. The air-fuel ratio control unit according to the present invention is not limited to the throttle valve 11. For example, when the internal combustion engine 1 is carried on a hybrid vehicle, it is also allowable that the air-fuel ratio of the air-fuel mixture is raised by decreasing the fuel injection amount in the internal combustion engine 1. In this case, the decrease in the engine torque of the internal combustion engine 1, which is accompanied by the decrease in the fuel injection amount, is supplemented by increasing the output of the motor, and thus the amount of decrease in the driving force of the vehicle is suppressed within an allowable range.

In this embodiment, ECU 20, which executes Step S308 or S312 in the flow described above, corresponds to the exhaust pressure reducing unit according to the present invention.

(First Modified Embodiment)

Next, a first modified embodiment of the embodiment of the present invention will be explained. In this modified embodiment, the exhaust pressure is reduced by raising the air-fuel ratio of the air-fuel mixture of the internal combustion engine 1 as compared with the reference air-fuel ratio even if the EGR valve 15 is stuck open and the opening degree is not more than the first predetermined opening degree when the operation state of the internal combustion engine 1 belongs to the operation area B shown in FIG. 2. In this case, the amount of increase in the EGR gas is small as compared with when the opening degree of the EGR valve 15 is larger than the first predetermined opening degree. Therefore, the target air-fuel ratio, which is used when the air-fuel ratio of the air-fuel mixture of the internal combustion engine 1 is raised as compared with the reference air-fuel ratio, is set to the value which is lower than the value to be used when the opening degree of the EGR valve 15 is larger than the first predetermined opening degree. Accordingly, it is possible to suppress the decrease in the engine torque of the internal combustion engine 1.

(Control Flow)

An explanation will be made below on the basis of a flow chart shown in FIG. 7 about a control flow to be used when the stuck open state arises in the EGR valve according to this modified embodiment. This flow is previously stored in ECU 20, and this flow is repeatedly executed at predetermined intervals by ECU 20. The steps, which are the same as those of the flow shown in FIG. 5, are designated by the same reference numerals, any explanation of which will be omitted.

In this flow, if the affirmative judgment is made in Step S306, the process of Step S407 is subsequently executed. In Step S407, the target air-fuel ratio A/F3, which is used when the air-fuel ratio of the air-fuel mixture is raised by increasing the opening degree of the throttle valve 11 in Step S409 as described later on, is determined on the basis of the operation state of the internal combustion engine 1 and the opening degree Rvegr of the EGR valve 15. The relationship among the target air-fuel ratio A/F3, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the higher the target air-fuel ratio A/F3 is.

The map, which is used to determine the target air-fuel ratio A/F1 in Step S407, is provided distinctly from the map which is used to determine the target air-fuel ratio A/F1 in Step S310 and the map which is used to determine the target air-fuel ratio A/F2 in Step S313. In these maps, there is given "reference air-fuel ratio<A/F3<A/F2<A/F1". Also in the map which is used to determine the target air-fuel ratio A/F3, the target air-fuel ratio A/F3 is set so that the amount of decrease in the engine torque of the internal combustion engine 1 is within an allowable range.

Subsequently, in Step S408, the target throttle valve opening degree Rvth, which is the opening degree of the throttle valve 11 at which the air-fuel ratio of the air-fuel mixture is the target air-fuel ratio A/F3, is determined.

Subsequently, in Step S409, the opening degree of the throttle valve 11 is increased to the target throttle valve opening degree Rvth. Accordingly, the intake air amount is increased, and the air-fuel ratio of the air-fuel mixture is raised to the target air-fuel ratio A/F3.

Also in this modified embodiment, it is allowable to provide a constant value for the target air-fuel ratio or the amount of increase when the air-fuel ratio of the internal combustion engine 1 is raised as compared with the reference air-fuel ratio in order to reduce the exhaust pressure when the opening degree of the stuck open FGR valve 15 is not more than the first predetermined opening degree Rv1. Also in this case, the respective values are set so that the amount of decrease in the engine torque of the internal combustion engine 1 is within an allowable range. Further, the target air-fuel ratio A/F3 is set so that there is given "reference air-fuel ratio<A/F3<A/F2<A/F1".

In this modified embodiment, ECU 20, which executes Step S409 or S312 in the flow described above, corresponds to the exhaust pressure reducing unit according to the present invention.

(Second Modified Embodiment)

Next, a second modified embodiment of the embodiment of the present invention will be explained. Also in this modified embodiment, when the operation state of the internal combustion engine 1 belongs to the operation area B shown in FIG. 2, the exhaust pressure is reduced by raising the air-fuel ratio of the air-fuel mixture of the internal combustion engine 1 as compared with the reference air-fuel ratio irrelevant to the opening degree of the stuck open EGR valve 15, in the same manner as in the first modified embodiment described above.

In this procedure, if the opening degree of the stuck open EGR valve 15 is smaller than the predetermined opening degree, the target air-fuel ratio is more raised as the opening degree is larger. On the other hand, when the opening degree of the stuck open EGR valve 15 is not less than the predetermined opening degree, the target air-fuel ratio is more lowered as the opening degree is larger. In this case, the predetermined opening degree is a threshold value of the opening degree of the EGR valve 15 with which the combustion state is further deteriorated if the air-fuel ratio of the air-fuel mixture is more raised as the opening degree of the stuck open EGR valve 15 is larger.

The predetermined opening degree is previously determined on the basis of, for example, an experiment, and the predetermined opening degree is stored in ECU 20. The predetermined opening degree may be changed depending on the operation state of the internal combustion engine 1.

According to the method as described above, it is possible to suppress any unnecessary decrease in the engine torque when the opening degree of the stuck open EGR valve 15 is smaller than the predetermined opening degree. When the opening degree of the stuck open EGR valve 15 is not less than the predetermined opening degree, it is possible to suppress any excessive deterioration of the combustion state.

(Control Flow)

Figure 8:
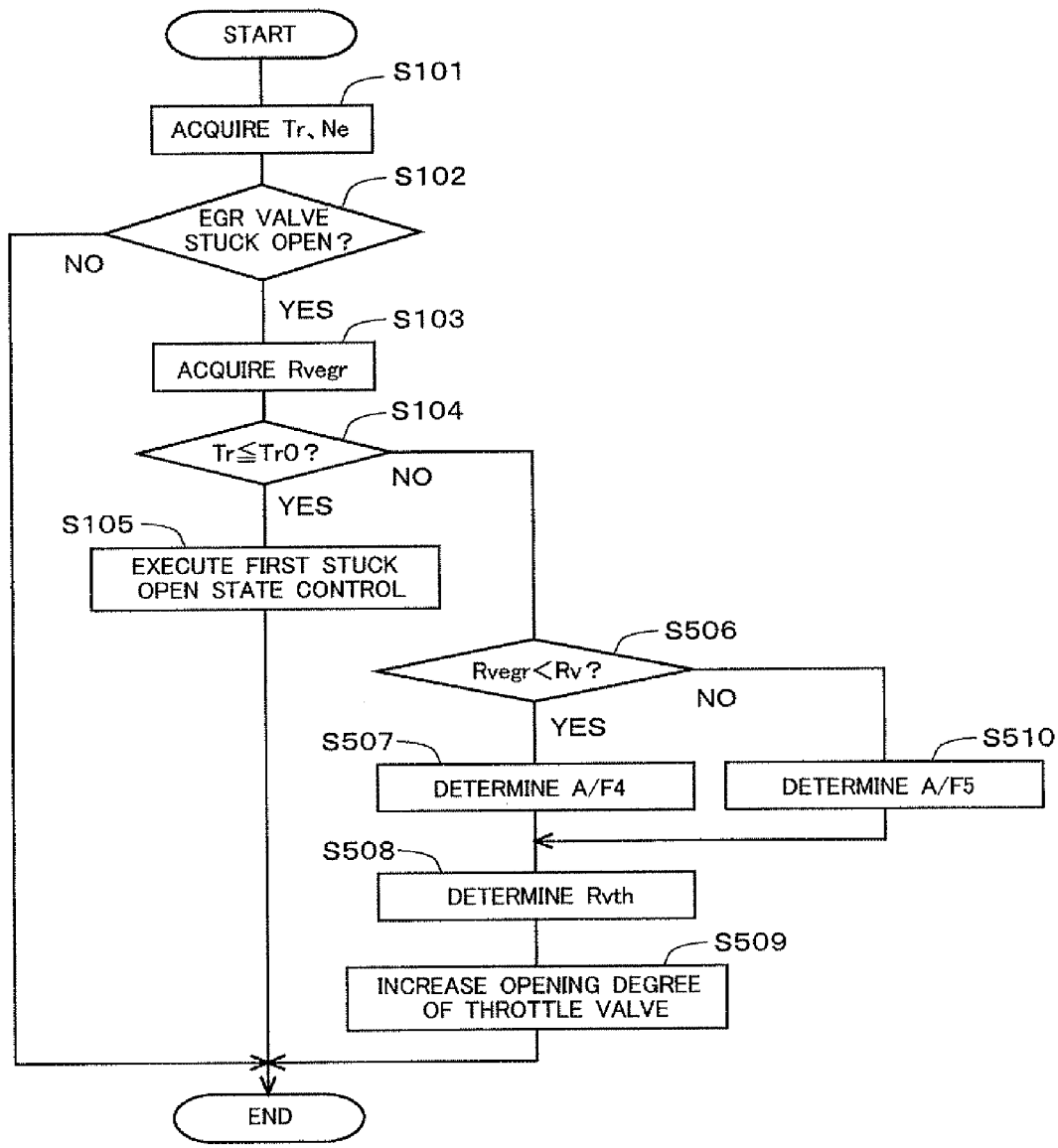
FIG. 8 shows a flow chart illustrating a control flow to be used when the stuck open state arises in an EGR valve according to a second modified embodiment of the second embodiment.

An explanation will be made below on the basis of a flow chart shown in FIG. 8 about a control flow to be used when the stuck open state arises in the EGR valve according to this modified embodiment. This flow is previously stored in ECU 20, and this flow is repeatedly executed at predetermined intervals by ECU 20. The steps, which are the same as those of the flow shown in FIG. 5, are designated by the same reference numerals, any explanation of which will be omitted.

In this flow, if the negative judgment is made in Step S104, the process of Step S506 is subsequently executed. In Step S506, it is judged whether or not the opening degree Rvegr of the EGR valve 15 is smaller than the predetermined opening degree Rv. If the affirmative judgment is made in Step S506, the process of Step S507 is subsequently executed. If the negative judgment is made, the process of Step S510 is subsequently executed.

In Step S507, the target air-fuel ratio A/F4, which is used when the air-fuel ratio of the air-fuel mixture is raised by increasing the opening degree of the throttle valve 11 in Step S508 as described later on, is determined on the basis of the operation state of the internal combustion engine 1 and the opening degree Rvegr of the EGR valve 15. The relationship among the target air-fuel ratio A/F4, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the higher the target air-fuel ratio A/F4 is.

On the other hand, in Step S510, the target air-fuel ratio A/F5, which is used when the air-fuel ratio of the air-fuel mixture is raised by increasing the opening degree of the throttle valve 11 in Step S508 as described later on, is determined on the basis of the operation state of the internal combustion engine 1 and the opening degree Rvegr of the EGR valve 15. The relationship among the target air-fuel ratio A/F5, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the lower the target air-fuel ratio A/F5 is.

The target air-fuel ratios A/F4, A/F5 are set so that the amount of decrease in the engine torque of the internal combustion engine 1 is within an allowable range in the map which is used to determine the target air-fuel ratio A/F4 in Step S507 and the map which is used to determine the target air-fuel ratio A/F5 in Step S10.

In Step S508, the target throttle valve opening degree Rvth is determined. In this procedure, if the process of Step S508 is performed next to Step S507, the target throttle valve opening degree Rvth is determined as the opening degree of the throttle valve 11 at which the air-fuel ratio of the air-fuel mixture is the target air-fuel ratio A/F4. On the other hand, if the process of Step S508 is performed next to Step S510, the target throttle valve opening degree Rvth is determined as the opening degree of the throttle valve 11 at which the air-fuel ratio of the air-fuel mixture is the target air-fuel ratio A/F5.

Subsequently, in Step S509, the opening degree of the throttle valve 11 is increased to the target throttle valve opening degree Rvth. Accordingly, the intake air amount is increased, and the air-fuel ratio of the air-fuel mixture is raised to the target air-fuel ratio A/F4 or A/F5.

In this modified embodiment, ECU 20, which executes Step S509 in the flow described above, corresponds to the exhaust pressure reducing unit according to the present invention.

[Third Embodiment]

Figure 9:
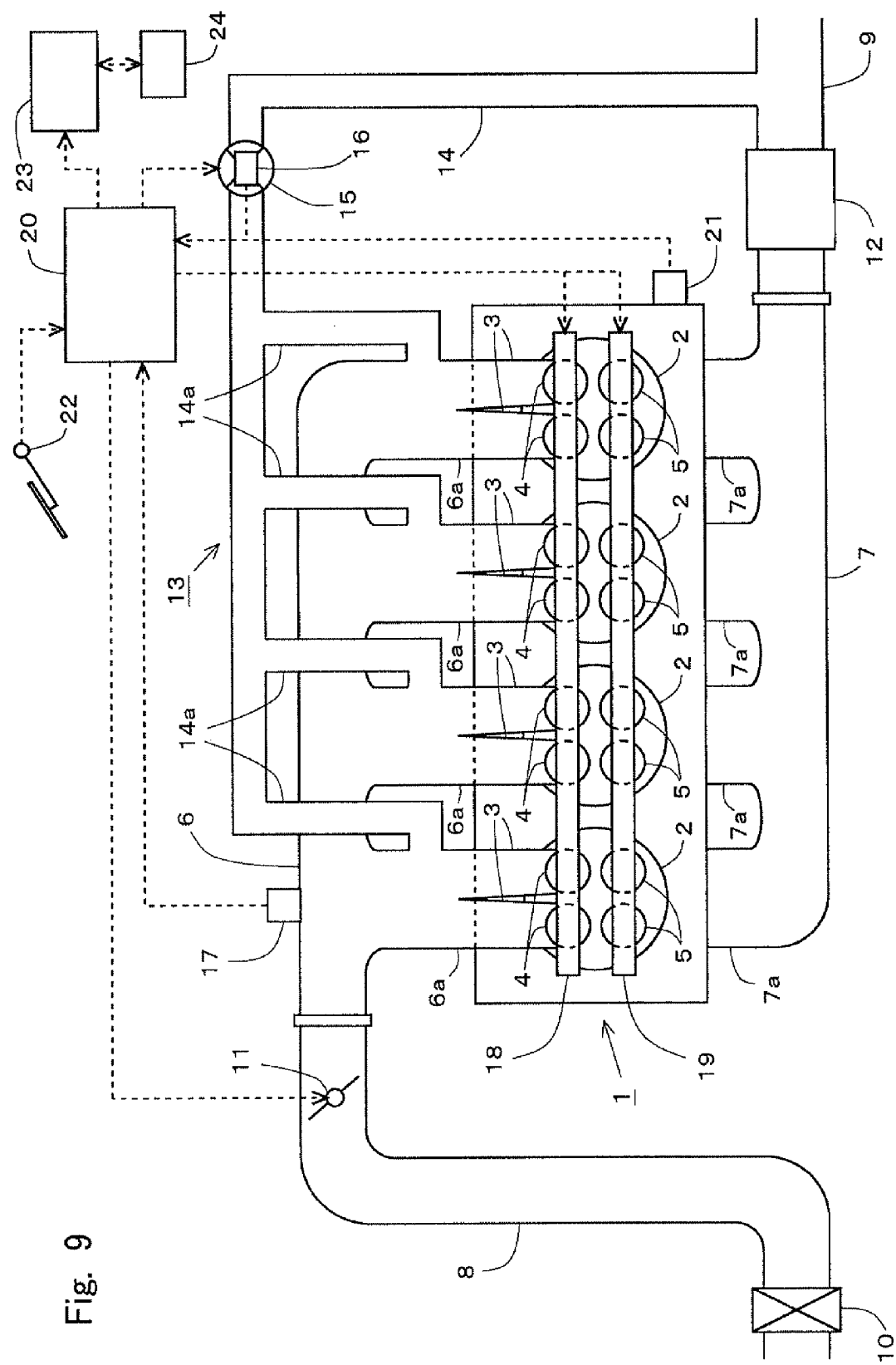
FIG. 9 shows a schematic arrangement of an internal combustion engine, an intake/exhaust system, and a hybrid system according to a third embodiment.
Figure 10:
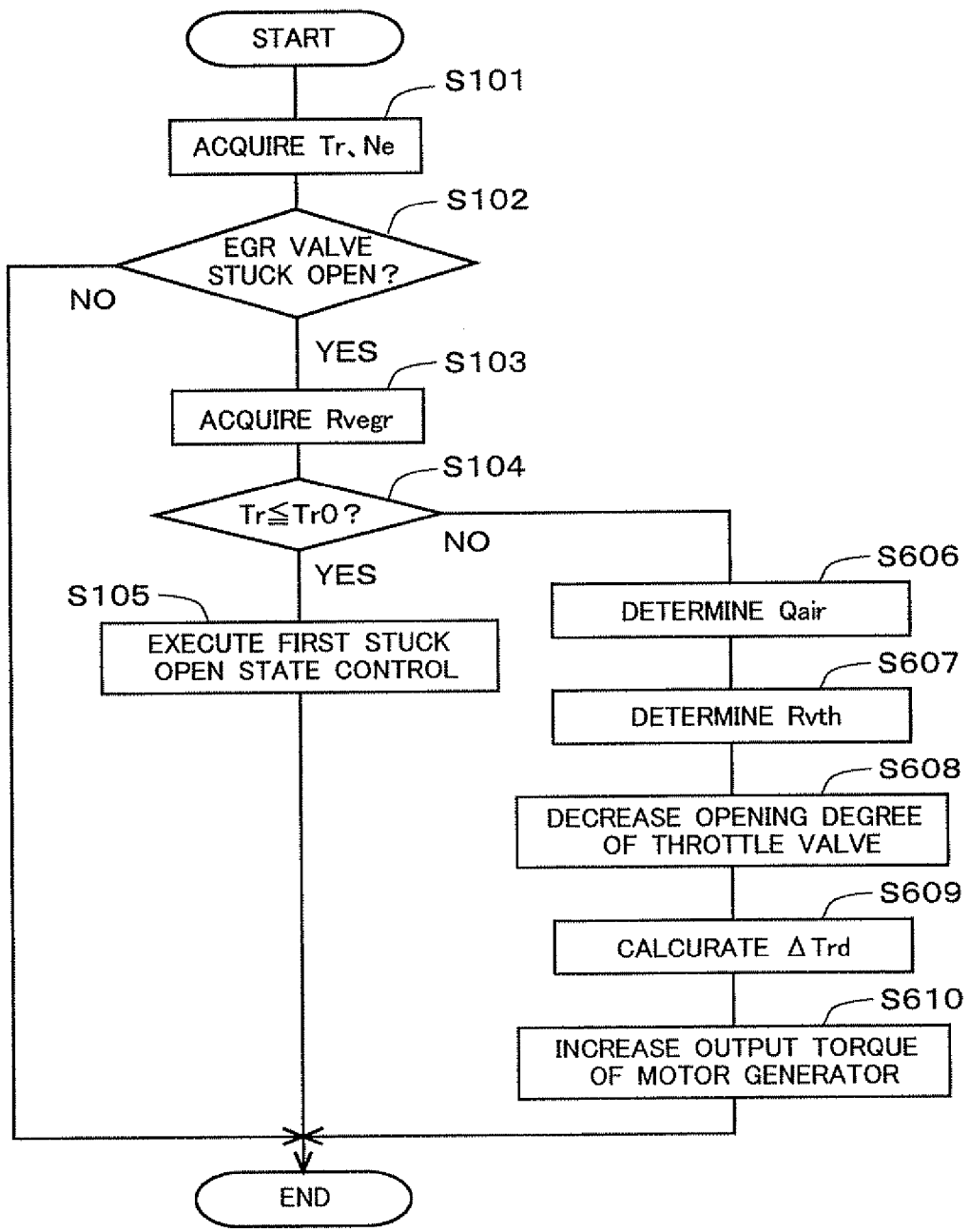
FIG. 10 shows a flow chart illustrating a part of a control flow to be used when the stuck open state arises in an EGR valve according to the third embodiment.

A third embodiment of the present invention will be explained on the basis of FIGS. 9 to 10. In this section, an explanation will be made about only features or points different from those of the first embodiment.

(Schematic Arrangement of System)

This embodiment is an embodiment in which the present invention is applied to a hybrid vehicle. FIG. 9 shows a schematic arrangement of an internal combustion engine, an intake/exhaust system, and a hybrid system according to this embodiment. The hybrid system according to this embodiment has the internal combustion engine 1 and a motor generator 23. An output shaft of the internal combustion engine 1 is connected to the motor generator 23 by the aid of a power transmission mechanism (not shown). Further, a battery 24 is electrically connected to the motor generator 23.

The motor generator 23 is electrically connected to ECU 20. The internal combustion engine 1 is assisted and the energy is regenerated by controlling the motor generator 23 by ECU 20.

(Control of EGR Valve in Stuck Open State)

Also in this embodiment, if the EGR valve 15 is stuck open when the operation state of the internal combustion engine 1 belongs to the operation area B shown in FIG. 2, the increase in the entire amount of the EGR gas and the dispersion of the EGR gas amount between the cylinders are suppressed by reducing the exhaust pressure in the exhaust passage 9, in the same manner as in the first embodiment. However, a method for reducing the exhaust pressure is different from that used in the first embodiment.

An explanation will be made below about the method for reducing the exhaust pressure when the EGR valve 15 is stuck open according to this embodiment. In this embodiment, when the exhaust pressure is reduced, the intake air amount of the internal combustion engine 1 is decreased by decreasing the opening degree of the throttle valve 11. The combustion pressure can be reduced by decreasing the intake air amount of the internal combustion engine 1. As a result, it is possible to reduce the exhaust pressure.

However, if the intake air amount is decreased, the engine torque of the internal combustion engine 1 is lowered. Accordingly, in this embodiment, the output torque of the motor generator 23 is increased in an amount corresponding to the decrease in the engine torque. Thus, it is possible to suppress the decrease in the driving force of the vehicle.

(Control Flow)

An explanation will be made below on the basis of a flow chart shown in FIG. 10 about a control flow to be used when the stuck open state arises in the EGR valve according to this embodiment. This flow is previously stored in ECU 20, and this flow is repeatedly executed at predetermined intervals by ECU 20. The steps, which are the same as those of the flow shown in FIG. 3, are designated by the same reference numerals, any explanation of which will be omitted.

In this flow, if the negative judgment is made in Step S104, the process of Step S606 is subsequently executed. In Step S606, the target intake air amount Qair, which is used when the intake air amount is decreased by decreasing the opening degree of the throttle valve 11 in Step S607 as described later on, is determined on the basis of the operation state of the internal combustion engine 1 and the opening degree Rvegr of the EGR valve 15. The relationship among the target intake air amount Qair, the operation state of the internal combustion engine 1, and the opening degree Rvegr of the EGR valve 15 is previously determined on the basis of, for example, an experiment, and the relationship is stored as a map in ECU 20. In the map, the larger the opening degree Rvegr of the EGR valve 15 is, the smaller the target intake air amount Qair is. In other words, the larger the opening degree Rvegr of the EGR valve 15 is, the larger the amount of decrease in the intake air amount is.

Subsequently, in Step S607, the target throttle valve opening degree Rvth, which is the opening degree of the throttle valve 11 at which the intake air amount is the target intake air amount Qair, is determined.

Subsequently, in Step S608, the opening degree of the throttle valve 11 is decreased to the target throttle valve opening degree Rvth. Accordingly, the intake air amount is decreased to the target intake air amount Qair.

Subsequently, in Step 9609, the amount of decrease ΔTrd in the engine torque, which is accompanied by the decrease in the intake air amount, is calculated.

Subsequently, in Step S610, the output torque of the motor generator 23 is increased by an amount corresponding to the amount of decrease ΔTrd in the engine torque.

In this embodiment, when a sensor for detecting the exhaust pressure or the combustion pressure is provided, it is also allowable that the opening degree of the throttle valve 11 is controlled so that the detected value of the sensor is the target value when the opening degree of the throttle valve 11 is decreased.

In this embodiment, ECU 20, which executes Step S608 or S610 in the flow described above, corresponds to the exhaust pressure reducing unit according to the present invention.

[Fourth Embodiment]

A fourth embodiment of the present invention will be explained on the basis of FIGS. 11 to 12. In this section, an explanation will be made about only features or points different from those of the first embodiment.

Figure 11:
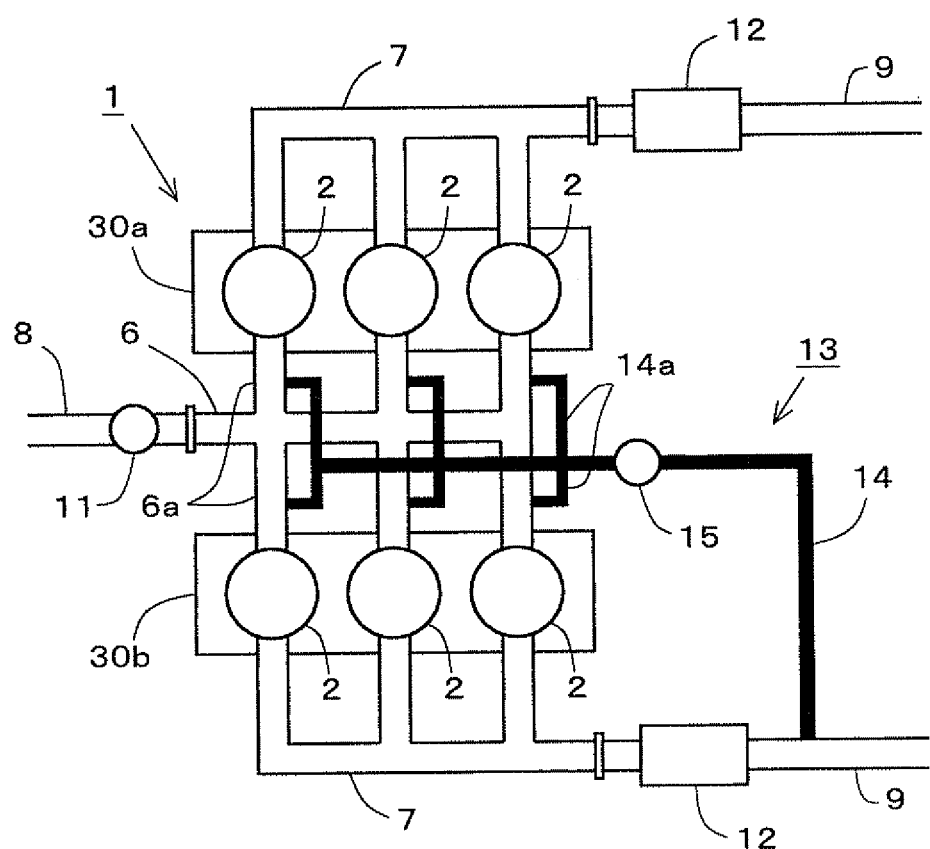
FIG. 11 shows a schematic arrangement of an internal combustion engine and an intake/exhaust system thereof according to a fourth embodiment.

FIG. 11 shows a schematic arrangement of an internal combustion engine and an intake/exhaust system thereof according to this embodiment. The internal combustion engine 1 according to this embodiment has two cylinder groups 30a, 30b. Each of the cylinder groups 30a, 30b has three cylinders 2. An intake VVT and an exhaust VVT are provided for each of the cylinder groups 30a, 30b (not shown). An intake passage 8 and an intake manifold 6 are common to the both cylinder groups 30a, 30b. Intake branch pipes 6a, which are formed by branching the intake manifold 6, are connected to intake ports of the respective cylinders 2 belonging to the respective cylinder groups 30a, 30b.

An exhaust passage 9 and an exhaust manifold 7 are provided for each of the cylinder groups. An EGR passage 14 is connected on the exhaust system side to a portion of the exhaust passage 9 corresponding to one cylinder group 30b, the portion being disposed on the downstream side from an exhaust gas purification apparatus 12. The EGR passage is branched on the intake system side into six EGR branch pipes 14a. The respective EGR branch pipes 14a are connected to the intake branch pipes 6a of the both cylinder groups 30a, 30b respectively. An EGR valve 15 is arranged on the upstream side along the flow of the EGR gas as compared with the branched portion of the EGR passage 14.

(Control of EGR Valve in Stuck Open State)

In this embodiment, the exhaust pressure, which is brought about in the exhaust passage 9 to which the exhaust system side of the EGR passage 14 is connected, i.e., the exhaust passage 9 which corresponds to the cylinder group 30b, exerts the influence on the entire amount of the EGR gas and the dispersion of the EGR gas amount between the cylinders when the EGR valve 15 is stuck open. Therefore, in this embodiment, if the EGR valve 15 is stuck open, the control of the EGR valve in the stuck open state is carried out for only the cylinder group 30b in the same manner as in the first embodiment. Accordingly, it is possible to suppress the deterioration of the combustion state and the decrease in the output in the other cylinder group 30a.

(Modified Embodiment)

Figure 12:
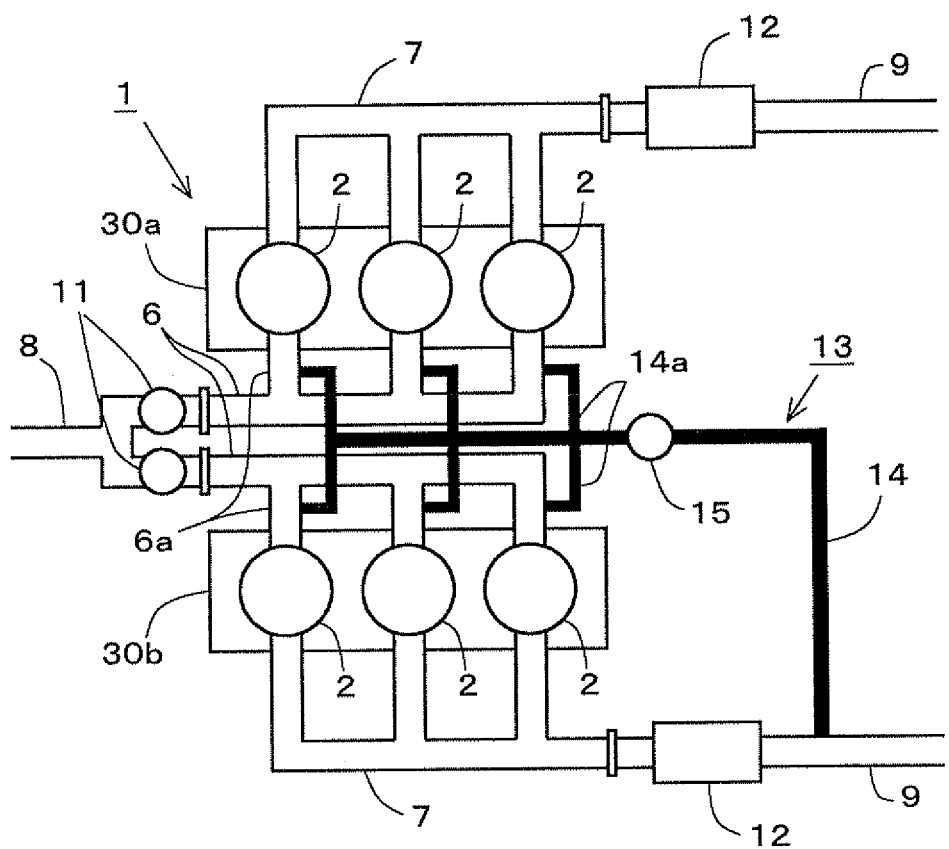
FIG. 12 shows a schematic arrangement of an internal combustion engine and an intake/exhaust system thereof according to a modified embodiment of the fourth embodiment.

FIG. 12 shows a schematic arrangement of an internal combustion engine and an intake/exhaust system thereof according to a modified embodiment of the embodiment of the present invention. In this modified embodiment, intake manifolds 6 are provided for the respective cylinder groups, and the intake passage 8 is branched into two which are connected to the respective intake manifolds 6. Further, throttle valves 11 are provided for the branched intake passages 8 respectively.

(Control of EGR Valve in Stuck Open State)

According to the arrangement concerning this modified embodiment, the intake air amount can be controlled for each of the cylinder groups by the throttle valves 11. In other words, it is possible to change only the air-fuel ratio of the air-fuel mixture for the cylinder group 30b. Accordingly, in this modified embodiment, when the EGR valve 15 is stuck open, the control of the EGR valve in the stuck open state is carried out for only the cylinder group 30b, in the same manner as in the second embodiment. Thus, it is possible to suppress the deterioration of the combustion state and the decrease in the output in the other cylinder group 30a in the same manner as described above.

The respective embodiments explained above can be combined with each other as far as possible.

DESCRIPTION OF THE REFERENCE SIGNS

1: internal combustion engine
2: cylinder
3: intake port
4: intake valve
5: exhaust valve
6: intake manifold
6a: intake branch pipe
7: exhaust manifold
7a: exhaust branch pipe
8: intake passage
9: exhaust passage
10: air flow meter
11: throttle valve
12: exhaust gas purification apparatus
13: EGR apparatus
14: EGR passage
14a: EGR branch pipe
15: EGR valve
16: EGR valve opening degree sensor
17: intake pressure sensor
20: ECU
21: crank position sensor
22: accelerator opening degree sensor
23: motor generator
24: battery
30a, 30b: cylinder group

The invention claimed is:

1. An EGR control system for an internal combustion engine, wherein:
   the internal combustion engine comprises:
   a plurality of cylinders;
   a plurality of intake branch pipes which are formed by branching an intake passage and which are connected to the plurality of cylinders respectively; and
   an EGR apparatus which has an EGR passage for making communication between an exhaust system and an intake system of the internal combustion engine and which has an EGR valve for controlling an amount of EGR gas allowed to flow through the EGR passage, wherein:
   the EGR passage is branched into a plurality of EGR branch pipes on a side of the intake system, the respective EGR branch pipes are connected to the plurality of intake branch pipes respectively; and
   the EGR valve is arranged on an upstream side along a flow of the EGR gas as compared with a branched portion of the EGR passage,
   the EGR control system for the internal combustion engine further comprises:
   stuck open state judging unit which judges whether or not the EGR valve sticks in a valve open state; and
   exhaust pressure reducing unit which reduces an exhaust pressure in the exhaust system of the internal combustion engine, while suppressing an amount of decrease in a driving force of a vehicle which carries the internal combustion engine within an allowable range, if it is judged by the stuck open state judging unit that the EGR valve sticks in the valve open state.

2. The EGR control system for the internal combustion engine according to claim 1, further comprising:
   an exhaust variable valve mechanism which controls a valve opening timing of an exhaust valve of the internal combustion engine, wherein:
   the exhaust pressure reducing unit reduces the exhaust pressure by retarding the valve opening timing of the exhaust valve within a range until arrival at a bottom dead center of an exhaust stroke by the exhaust variable valve mechanism.

3. The EGR control system for the internal combustion engine according to claim 2, wherein:
   the exhaust variable valve mechanism is such a mechanism that when the valve opening timing of the exhaust valve is changed, a valve closing timing of the exhaust valve is also changed in accordance therewith;

the EGR control system for the internal combustion engine further comprises an intake variable valve mechanism which controls a valve opening timing of an intake valve of the internal combustion engine; and the valve opening timing of the intake valve is retarded by the intake variable valve mechanism when the exhaust pressure reducing unit retards the valve opening timing of the exhaust valve by the exhaust variable valve mechanism.

4. The EGR control system for the internal combustion engine according to claim 3, wherein:

the intake variable valve mechanism is such a mechanism that when the valve opening timing of the intake valve is changed, a valve closing timing of the intake valve is also changed in accordance therewith; and an amount of retard is decreased if the EGR valve, which sticks in the valve open state, has a small opening degree as compared with if the EGR valve, which sticks in the valve open state, has a large opening degree, when the valve opening timing of the intake valve is retarded by the intake variable valve mechanism.

5. The EGR control system for the internal combustion engine according to claim 1, further comprising:

air-fuel ratio control unit which controls an air-fuel ratio of an air-fuel mixture of the internal combustion engine, wherein:

the exhaust pressure reducing unit reduces the exhaust pressure by raising the air-fuel ratio of the air-fuel mixture of the internal combustion engine by the air-fuel ratio control unit as compared with a reference air-fuel ratio which is an air-fuel ratio to be provided in a normal state.

6. The EGR control system for the internal combustion engine according to claim 5, wherein the air-fuel ratio is controlled within a low range if the opening degree of the EGR valve which sticks in the valve open state is not more than a first predetermined opening degree and if the opening degree is not less than a second predetermined opening degree which is larger than the first predetermined opening degree, as compared with if the opening degree is larger than the first predetermined opening degree and smaller than the second predetermined opening degree, when the exhaust pressure reducing unit raises the air-fuel ratio of the air-fuel mixture of the internal combustion engine as compared with the reference air-fuel ratio by the air-fuel ratio control unit.

7. The EGR control system for the internal combustion engine according to claim 5, wherein the larger the opening degree is, the higher the air-fuel ratio is, if the opening degree of the EGR valve which sticks in the valve open state is smaller than a predetermined opening degree, while the larger the opening degree is, the lower the air-fuel ratio is, if the opening degree of the EGR valve which sticks in the valve open state is not less than the predetermined opening degree, when the exhaust pressure reducing unit raises the air-fuel ratio of the air-fuel mixture of the internal combustion engine as compared with the reference air-fuel ratio by the air-fuel ratio control unit.

8. The EGR control system for the internal combustion engine according to claim 1, further comprising:

an intake variable valve mechanism which controls a valve closing timing of an intake valve of the internal combustion engine; and air-fuel ratio control unit which controls an air-fuel ratio of an air-fuel mixture of the internal combustion engine, wherein:

the exhaust pressure reducing unit reduces the exhaust pressure by retarding the valve closing timing of the intake valve by the intake variable valve mechanism, if an opening degree of the EGR valve which sticks in the valve open state is not more than a predetermined opening degree; and the exhaust pressure reducing unit reduces the exhaust pressure by raising the air-fuel ratio of the air-fuel mixture of the internal combustion engine by the air-fuel ratio control unit as compared with a reference air-fuel ratio which is an air-fuel ratio in a normal state, if the opening degree of the EGR valve which sticks in the valve open state is larger than the predetermined opening degree.

9. The EGR control system for the internal combustion engine according to claim 8, wherein:

the predetermined opening degree is a first predetermined opening degree; and the air-fuel ratio is lowered if the opening degree of the EGR valve which sticks in the valve open state is not less than a second predetermined opening degree as compared with if the opening degree is smaller than the second predetermined opening degree, when the opening degree of the EGR valve which sticks in the valve open state is larger than the first predetermined opening degree, and the exhaust pressure reducing unit raises the air-fuel ratio of the air-fuel mixture of the internal combustion engine as compared with the reference air-fuel ratio by the air-fuel ratio control unit.

10. The EGR control system for the internal combustion engine according to claim 1, wherein:

the vehicle, which carries the internal combustion engine, further includes a motor as a driving source; and the exhaust pressure reducing unit reduces the exhaust pressure by decreasing an intake air amount of the internal combustion engine, and the amount of decrease in the driving force of the vehicle is suppressed within the allowable range by increasing an output of the motor.

11. The EGR control system for the internal combustion engine according to claim 1, wherein:

the plurality of cylinders are divided into those which are included in a plurality of cylinder groups;

the EGR passage is connected on a side of the exhaust system to the exhaust system which corresponds to only a part of the cylinder group or groups of the plurality of cylinder groups; and the exhaust pressure reducing unit reduces the exhaust pressure in the exhaust system to which the EGR passage is connected, if it is judged by the stuck open state judging unit that the EGR valve sticks in the valve open state.

* * * * *